United States Patent [19]
Ahrens et al.

[11] Patent Number: 5,951,620
[45] Date of Patent: *Sep. 14, 1999

[54] SYSTEM AND METHOD FOR DISTRIBUTING INFORMATION FOR STORAGE MEDIA

[75] Inventors: John Ahrens, Carol Stream; John Jasper, Arlington Hts.; Joseph Kohler, Wheaton; T. Russell Shields, Chicago, all of Ill.

[73] Assignee: Navigation Technologies Corporation, Rosemont, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/592,737

[22] Filed: Jan. 26, 1996

[51] Int. Cl.⁶ .......................... G06F 17/30; G06F 165/00
[52] U.S. Cl. .................. 701/200; 701/210; 701/35
[58] Field of Search ................. 364/443, 449.2, 364/449.4, 449.7; 340/998, 990, 995; 395/601, 619, 757, 839, 840, 430; 369/29, 33, 34, 47; 701/200, 208, 210, 213, 211, 35

[56] References Cited

U.S. PATENT DOCUMENTS

| | | | |
|---|---|---|---|
| 4,528,643 | 7/1985 | Freeny, Jr. | 364/918 |
| 4,642,775 | 2/1987 | Cline et al. | 364/443 |
| 4,677,604 | 6/1987 | Selby, III et al. | 369/33 |
| 4,774,671 | 9/1988 | Itoh et al. | 364/449.2 |
| 4,774,672 | 9/1988 | Tsunoda et al. | 364/449.2 |
| 4,939,663 | 7/1990 | Baird | 364/449.2 |
| 4,951,211 | 8/1990 | De Villeroche | 364/444.2 |
| 4,962,457 | 10/1990 | Chen et al. | 364/443 |
| 4,994,971 | 2/1991 | Poelstra | 364/424.04 |
| 5,177,685 | 1/1993 | David et al. | 364/443 |
| 5,216,605 | 6/1993 | Yardley et al. | 364/424.027 |
| 5,231,584 | 7/1993 | Nimura et al. | 340/990 |
| 5,239,472 | 8/1993 | Long et al. | 364/426.05 |
| 5,272,639 | 12/1993 | McGuffin | 364/449.1 |
| 5,274,560 | 12/1993 | LaRue | 340/988 |

(List continued on next page.)

FOREIGN PATENT DOCUMENTS

| | | |
|---|---|---|
| 0 317 181 A2 | 5/1989 | European Pat. Off. . |
| 0 529857 A2 | 3/1993 | European Pat. Off. . |
| 0 585 950 A2 | 3/1994 | European Pat. Off. . |
| 0 627 612 A1 | 12/1994 | European Pat. Off. . |
| 2 694 120 | 1/1994 | France . |
| 33 33 167 A1 | 3/1985 | Germany . |
| 41 41 597 A1 | 6/1993 | Germany . |
| 06-266997 | 9/1994 | Japan . |
| 07079196 | 3/1995 | Japan . |
| 07-092906 | 4/1995 | Japan . |
| WO 86/01023 | 2/1986 | WIPO . |

OTHER PUBLICATIONS

Partial Search Report (EP 97 30 0449) Apr. 23, 1997.

*Primary Examiner*—Tan Q. Nguyen
*Attorney, Agent, or Firm*—Frank J. Kozak; Lawrence M. Kaplan

[57] ABSTRACT

A system and method for distributing information for storage media, and in particular, for distributing updated navigation data, such as geographical data and navigation application programs, contained on storage media and used in in-vehicle navigation systems. A plurality of local repositories are located in a geographical area. Each of the local repositories includes updated versions of navigation data for the navigation systems. Owners of vehicles having navigation systems may visit any of the repositories from time to time where they can obtain updated versions of the navigation data for their navigation systems. Subscriptions for obtaining updated navigation data would be available to the owners of navigation systems that would entitle them to obtain updated navigation data from the repositories. Procedures for updating the local repositories are also provided. The system and method can be used for updating other types of software.

74 Claims, 30 Drawing Sheets

Microfiche Appendix Included
(4 Microfiche, 322 Pages)

U.S. PATENT DOCUMENTS

| | | | |
|---|---|---|---|
| 5,278,759 | 1/1994 | Berra et al. | 364/423.098 |
| 5,311,195 | 5/1994 | Mathis et al. | 342/357 |
| 5,353,023 | 10/1994 | Mitsugi | 340/989 |
| 5,353,034 | 10/1994 | Sato et al. | 342/457 |
| 5,359,529 | 10/1994 | Snider | 364/449.4 |
| 5,365,448 | 11/1994 | Nobe et al. | 364/449.2 |
| 5,384,749 | 1/1995 | Lisart et al. | 365/230.01 |
| 5,398,189 | 3/1995 | Inoue et al. | 364/449.5 |
| 5,406,490 | 4/1995 | Braegas | 364/449.4 |
| 5,422,814 | 6/1995 | Sprague et al. | 364/449.7 |
| 5,426,422 | 6/1995 | Vanden Heuvel et al. | 340/825.27 |
| 5,452,212 | 9/1995 | Yokoyama et al. | 364/449.5 |
| 5,463,554 | 10/1995 | Araki et al. | 364/449.5 |
| 5,473,540 | 12/1995 | Schmitz | 364/423.898 |
| 5,506,986 | 4/1996 | Healy | 395/620 |
| 5,515,284 | 5/1996 | Abe | 364/444.2 |
| 5,559,520 | 9/1996 | Barzegar et al. | 342/357 |
| 5,565,874 | 10/1996 | Rode | 340/990 |
| 5,581,462 | 12/1996 | Rogers | 364/424.012 |

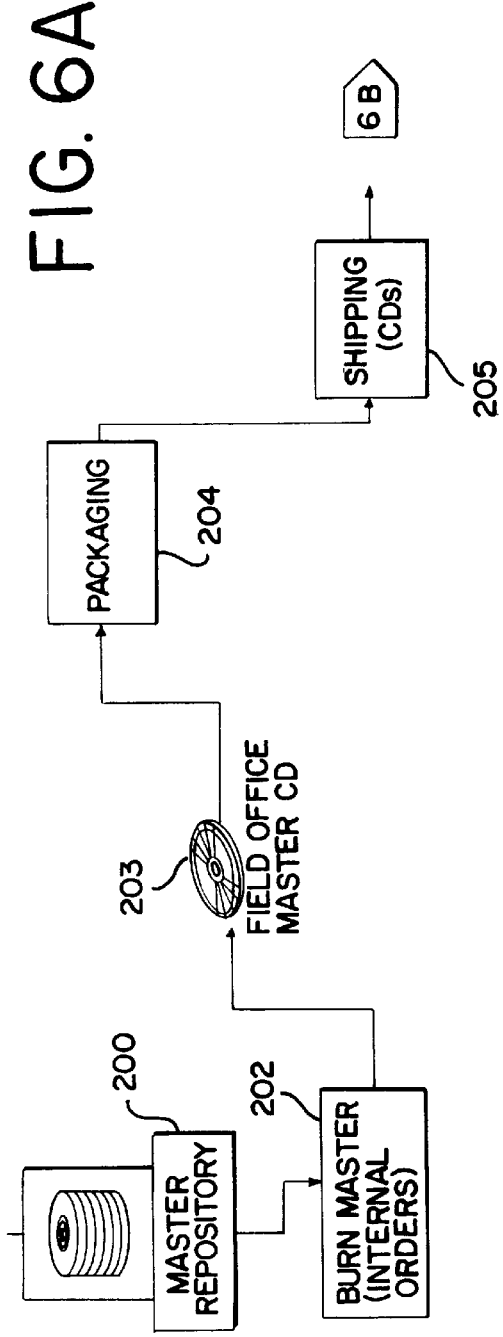
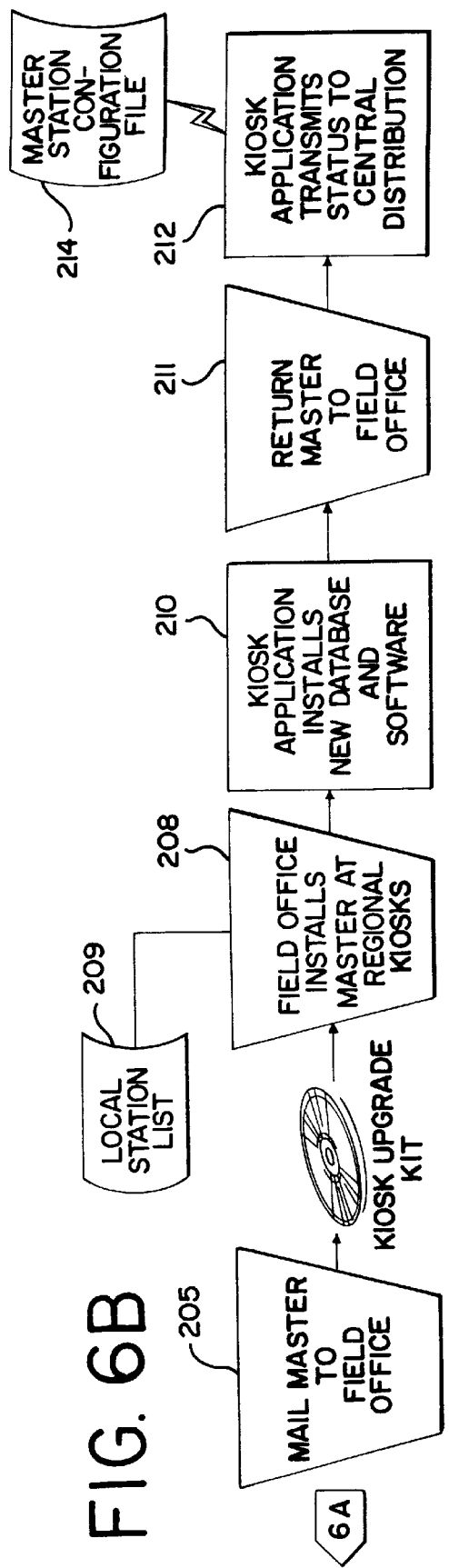
FIG. 6A
FIG. 6B

FIG. 11

SELECT REGION

NAVIGATION UPDATE PROGRAM

SELECT THE REGION DESIRED BY THE CUSTOMER.

CURRENT REGION: CALIFORNIA

| | REGION | AVAILABLE AT KIOSK | DESCRIPTION OF REGION |
|---|---|---|---|
| ☒ | CALIFORNIA | YES | ENTIRE STATE OF CALIFORNIA. |
| ☐ | DETROIT | NO | METROPOLITAN DETROIT. |
| ☐ | HEARTLAND | YES | INCLUDES: IOWA, KANSAS, MISSOURI, NEBRASKA. |
| ☐ | MIDDLE ATLANTIC | NO | INCLUDES: MARYLAND, NEW JERSEY, PENNSYLVANIA. |
| ☐ | NEW ENGLAND | NO | INCLUDES: CONNECTICUT, MAINE, MASSACHUSETTS, NEW HAMPSHIRE, VERMONT. |
| ☐ | NORTHWEST | YES | INCLUDES: IDAHO, OREGON, WASHINGTON. |
| ☐ | SKY COUNTRY | YES | INCLUDES: MONTANA, NORTH DAKOTA, SOUTH DAKOTA, WYOMING. |
| ☐ | SOUTHLAND | YES | INCLUDES: ALABAMA, GEORGIA, NORTH CAROLINA, SOUTH CAROLINA. |

[OK]　[SHOW DETAIL]　[CANCEL]　[HELP]

CHOOSE SHOW DETAIL TO LIST A LONG DESCRIPTION OF A REGION

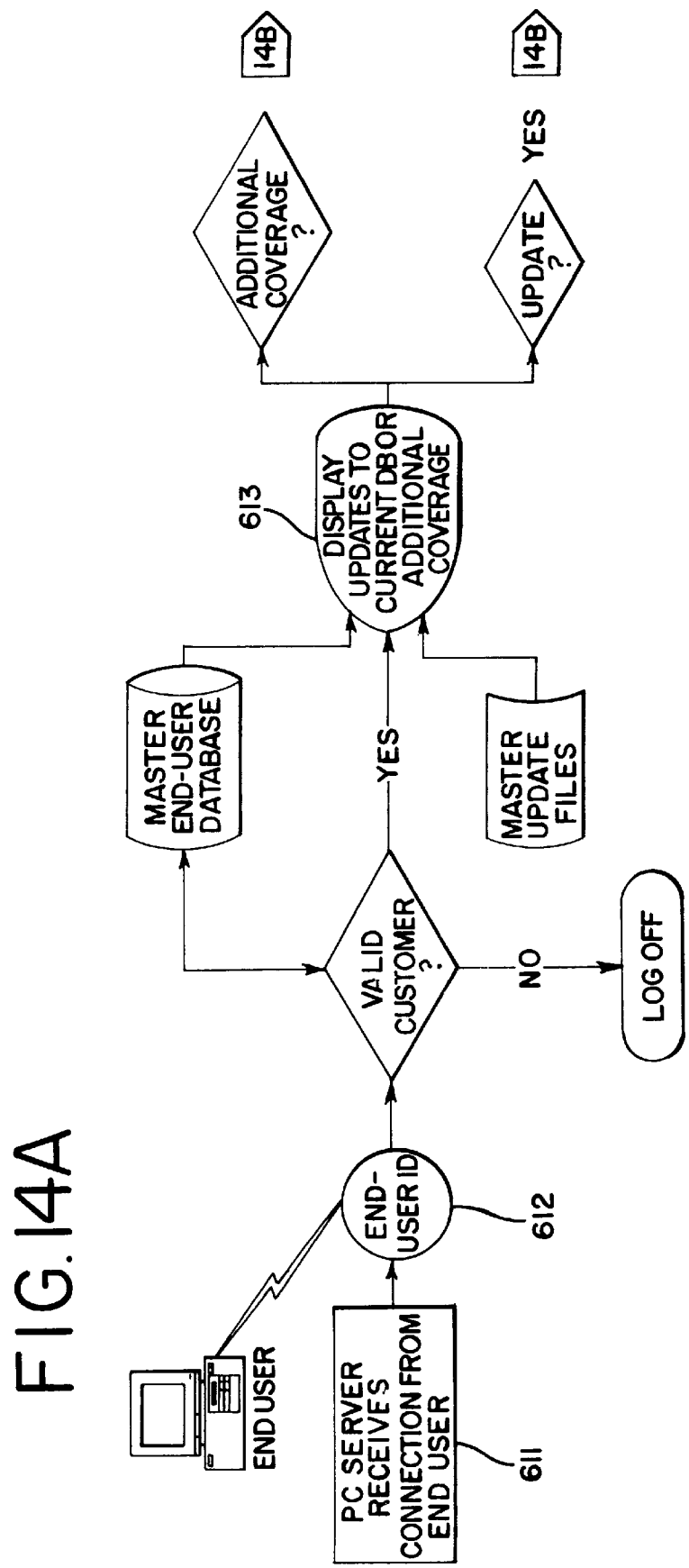

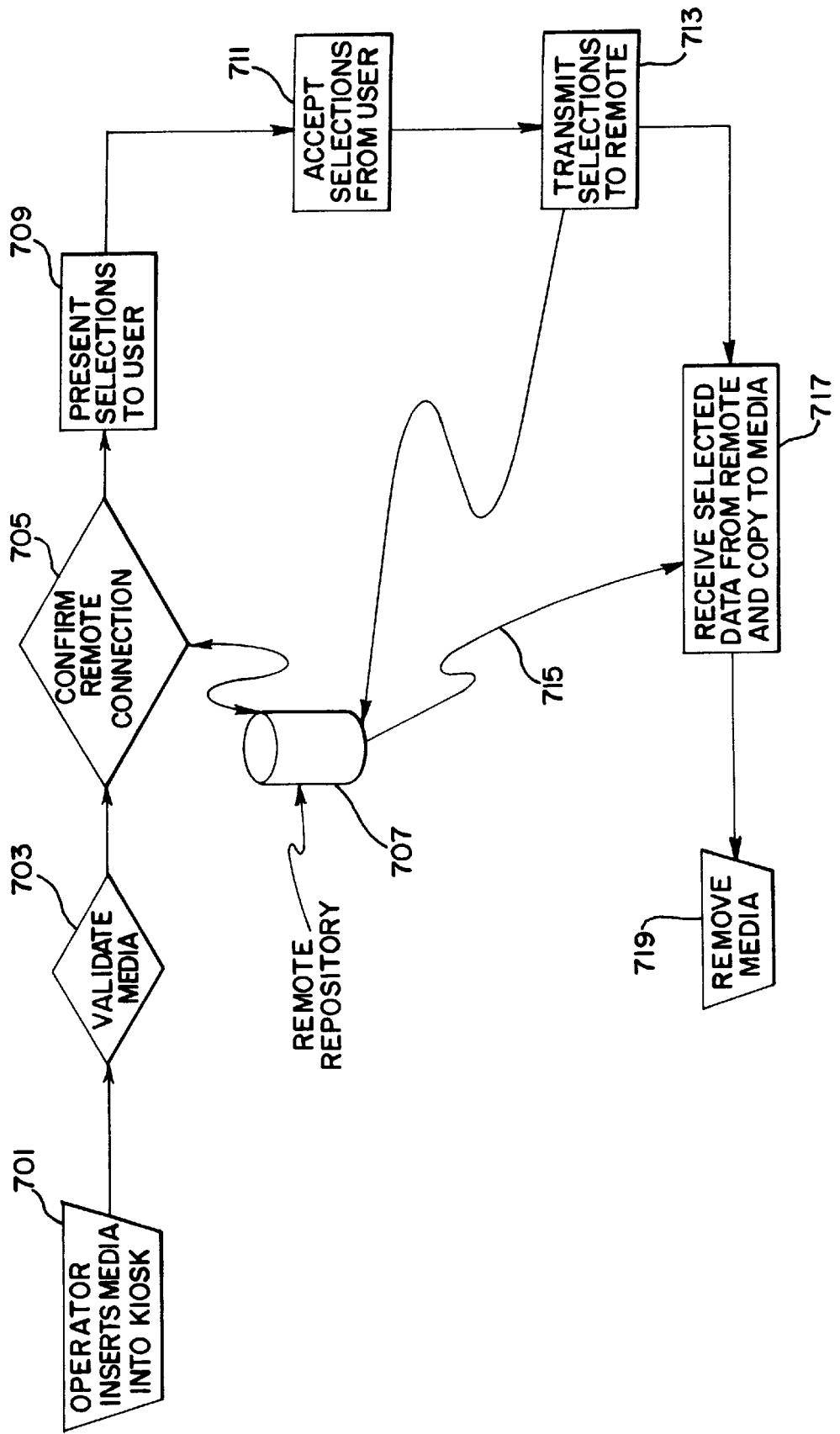

SYSTEM AND METHOD FOR DISTRIBUTING INFORMATION FOR STORAGE MEDIA

REFERENCE TO MICROFICHE APPENDIX

Included with this specification is a microfiche appendix including 4 sheets of 322 total frames.

BACKGROUND OF THE INVENTION

The present invention relates to a system and method for distributing data to be stored on storage media, and more particularly, the present invention relates to a system and method for distributing updated and/or upgraded navigation data, such as geographical data and navigation application programs, that are stored on storage media and used in navigation systems in vehicles, such as automobiles.

Certain types of products owned by consumers require regular or periodic updating. Products that require updating include navigation systems, and in particular, in-vehicle navigation systems that use navigation data, such as geographical data and navigation programs. In-vehicle navigation systems are electronic and/or computer systems installed in land-based vehicles, such as automobiles, trucks, vans, etc., and that provide enhanced and detailed navigation support features for vehicle drivers and passengers.

One exemplary type of in-vehicle navigation system uses (1) a positioning system; (2) a detailed data set (or map) of a geographical area; and (3) a navigation application program. The positioning system may use any of several well-known technologies that help determine or approximate one's physical location. For example, the positioning system may employ a GPS-type system (global positioning system), a "dead reckoning"-type system, inertial sensors, differential odometers, or combinations of these, or other systems, all of which are well-known in the art. GPS is a sensor-type of system that receives signals transmitted from satellites to determine one's position in terms of latitude and longitude. Dead-reckoning systems keep track of a vehicle's distance and heading (e.g. speed and bearing). One type of in-vehicle navigation system that includes a positioning system is available from Zexel USA of Sunnyvale, Calif.

The detailed geographical data set portion of the vehicle navigation system is in the form of one or more detailed, organized data files or databases. The detailed geographical data set may include information about the positions of streets and intersections in or related to a specific geographical area, and may also include information about one-way streets, street lights, stop signs, turn restrictions, street addresses, alternative routes, hotels, restaurants, museums, stadiums, offices, automobile dealerships, auto repair shops, etc.

The navigation application program portion of the vehicle navigation system is a software program that uses the detailed geographical data set and the output of the positioning system. The navigation application program may provide the driver with a graphical display (e.g. a "map") of his specific location in the geographical area. In addition, the navigation application program may also provide the driver with specific directions to many locations in the geographical area from wherever he is located. For example, the navigation application program may be able to give detailed directions to a hotel, e.g. "turn left at the third stoplight; stay in the right lane; proceed 1.1 miles to entrance ramp to I-290 westbound; enter I-290 expressway; proceed westbound 2.2 miles; etc. . . . . "

(Another type of navigation system does not include a positioning system. This type of navigation system does not automatically provide the user with information about his present location, but instead requires the user to provide both a destination and a starting point. Otherwise, this type of navigation system provides similar features to the user as the type of system that includes a positioning system.)

One problem associated with providing detailed geographical data for in-vehicle navigation systems is that the data becomes out-of-date (i.e. geographical information is "perishable"). For example, new roads are built, businesses change locations, road construction closes roads, detours are established, museum and restaurant hours change, etc. Another problem associated with navigation systems is that different automobile owners may want to have different collections of geographical data. For example, some automobile owners located in Chicago may want to have geographical information about Wisconsin or Indiana. Other Chicago automobile owners might also want to have information about California or Florida. Some automobile owners might want data listings of restaurants, while others might want data listings of movie theaters or businesses. Thus, not only does the information in the geographical data sets become out-of-date, but the collections of geographical data sets in the in-vehicle navigation systems of different vehicle owners may be significantly different. Another problem associated with in-vehicle navigation systems is that geographical data files represent a relatively large amount of data that needs to be updated. Still another problem associated with updating in-vehicle navigation systems is that there are a number of different navigation systems that are available, and that the navigation data and/or formats may differ among at least some of the different navigation systems.

Accordingly, there is a need for a system and method for updating and distributing data for in-vehicle navigation systems, such as updated geographical data or navigation application programs.

Further, more generally, there is a need for a system that permits the updating of consumer software products, as needed.

SUMMARY OF THE INVENTION

To achieve the foregoing and other objectives and in accordance with the purposes of the present invention, there is provided an improved method and system that provides for distributing data for storage media, and in particular, the present invention provides for the updating and/or upgrading of data, such as geographical data and navigation application programs, used in in-vehicle navigation systems. A plurality of local repositories are located in a geographical area. Each of the local repositories includes updated versions of navigation data for the in-vehicle navigation systems. The navigation data may include geographical data files and navigation application programs. Owners of vehicles having in-vehicle navigation systems may visit any of the local repositories from time to time to obtain updated versions of the navigation data for their in-vehicle navigation systems. Subscriptions for obtaining updated navigation data would be available to owners of in-vehicle navigation systems entitling them to obtain updated navigation data from the local repositories. Procedures for updating the local repositories are also provided. The system and method can be used for updating other types of data and/or software.

BRIEF DESCRIPTION OF THE DRAWINGS

FIGS. 6A and 6B show a flow chart of the steps for installing updated data on the plurality of local repositories shown in FIG. 1.

FIG. 11 shows still another sample display shown on the local repository during the updating procedure.

FIG. 12I is a flow chart for an alternative embodiment of the local operator portion of the embodiment of FIGS. 12A–12H.

FIGS. 14A–14C are flow charts for another alternative embodiment of the present invention.

FIG. 15 is a flow chart for another embodiment of the present invention.

DETAILED DESCRIPTION OF THE PREFERRED EMBODIMENTS

I. Overview of first embodiment

Figure 1:
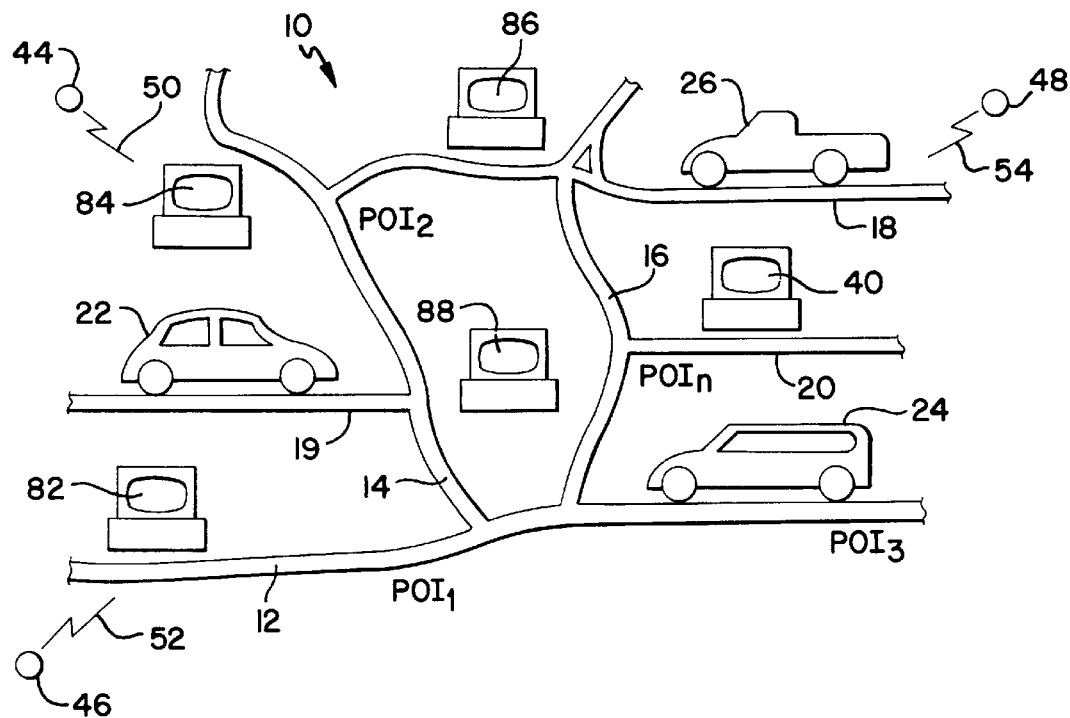
FIG. 1 is a diagram illustrating a plurality of vehicles in a geographical area being served by a first embodiment of the present invention.

Referring to FIG. 1, there is illustrated a map including an embodiment of the present invention. A geographical area 10 includes a plurality of points of interest, $POI_1$ through $POI_n$, linked by a plurality of roads 12, 14, 16, 18, 19, and 20. Vehicles 22, 24, and 26, such as automobiles, vans, trucks, etc., are driven on the plurality of roads 12, 14, 16, 18, 19, and 20 in the geographical area 10. A plurality of satellites 44, 46, 48, output signals 50, 52, and 54 that can be detected in the geographical area 10. In the present embodiment, the geographical area 10 may include a metropolitan area, such as New York and its suburbs, Chicago and its suburbs, or Los Angeles and its suburbs, or alternatively, the geographical area may include an entire state or region, such as Florida, New England, or the Rocky Mountains. The geographical area may be in the United States or in other countries. The points of interest may be hotels, restaurants, museums, stadiums, offices, automobile dealerships, auto repair shops, etc. Although FIG. 1 shows only three vehicles, the plurality of vehicles may include hundreds, thousands, or millions of vehicles.

Figure 2:
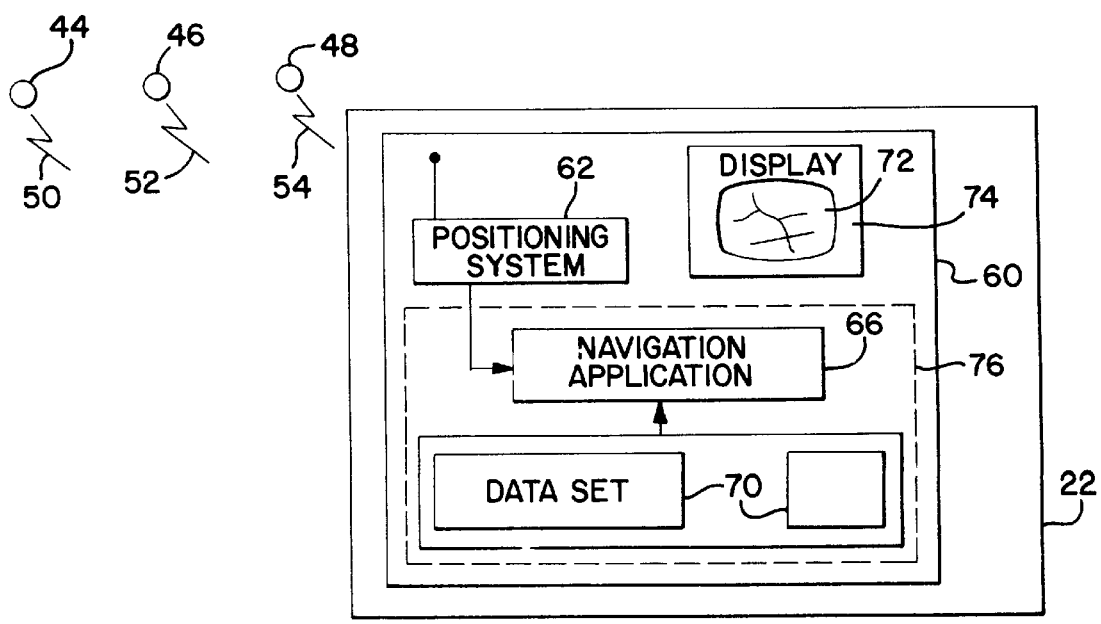
FIG. 2 is a block diagram illustrating one of the vehicles in FIG. 1.

FIG. 2 diagrammatically illustrates one of the vehicles 22. The vehicle 22 includes an in-vehicle navigation system 60. The in-vehicle navigation system 60 includes a positioning system portion 62 that outputs information about the position of the vehicle 22. This information may be in terms of latitude and longitude, distance and heading, etc. The in-vehicle navigation system 60 also includes at least two navigation data components: a navigation system application program 66 and a geographical data set 70. The navigation application program 66 receives information about the geographical position of the vehicle 22 from the positioning system 62. The geographical data set 70 comprises one or more large-scale data files or databases that include detailed information about the geographical area 10. Geographical data sets are known in the art. Geographical data set files may be stored in DOS-based files or in non-DOS or proprietary formats. The geographical data set may include geographical data, such as road geometry attribute information and points-of-interest information. The road geometry attribute information may include data about the positions of streets and intersections in or related to a specific geographical area, information about one-way streets, street lights, stop signs, turn restrictions, street addresses, etc. Point-of-interest information may include data about the location of airports, car rental agencies, service centers, etc. The geographical data set may also include additional data about other types of points of interest, such as restaurants, hotels, health clubs, etc. These additional data may be provided by third parties. A vehicle owner may have the opportunity to customize his navigation system to include the desired geographical areas and types of additional information. Thus, the geographical data sets of different vehicles owners may include significantly different types of information.

In one embodiment, the navigation application program 66 uses the output information from the positioning system 62, combined with the geographical data set 70, to provide navigation services, features, and information to the driver of the vehicle 22. Using output from the positioning system 62 and the geographical data set 70, the navigation application program can provide a map 72 on a display 74. The display 74 is located in the vehicle in a position where it is observable by the driver of the vehicle 22. The map 72 on the display 74 may illustrate the location of the vehicle 22 in a portion of the geographical area 10. The navigation application program 66 may provide information about what points of interest are available, distances to various points of interest, directions (visual and/or audible) to a desired destination, such as a street address or a point of interest (POI), and so on.

In present embodiments, the positioning system portion 62 and navigation application portion 66 of the in-vehicle navigation system 60 may be assembled or manufactured by one company, whereas the geographical data set portion 70 of the in-vehicle navigation system may be manufactured and produced by another company, such as Navigation Technologies, Inc. of Sunnyvale, Calif. The entire in-vehicle navigation system 60 may be combined and sold as a unit to automobile manufacturers, owners of vehicles, or owners of fleets of vehicles. The in-vehicle navigation system may be installed into a vehicle by an automobile manufacturer as optional or standard equipment on a new vehicle, or may be installed into a vehicle after it has been manufactured. (For purposes of this specification, "vehicle owners" are intended to include persons, or other entities, that own, lease, borrow, or otherwise exercise some control over a vehicle.)

As mentioned above, the geographical data set 70, and possibly the navigation application program 66, require updating, upgrading, or replacement from time to time. New roads are built, new points of interests are constructed, some old points of interest close or move, stop lights are added, speed limits change, etc. Therefore, according to a present embodiment, the geographical data set 70, and possibly the navigation application program 66, are designed to be replaced, updated, or upgraded. To provide for this capability, in a present embodiment, the geographical data set 70 and the navigation application program 66 are stored on a storage device 76. In a preferred embodiment, the storage device 76 is preferably also replaceable, re-writable, and portable. According to a present embodiment, the storage device 76 is a hard disk on a PC Card (also referred to as a PCMCIA card).

Figure 3:
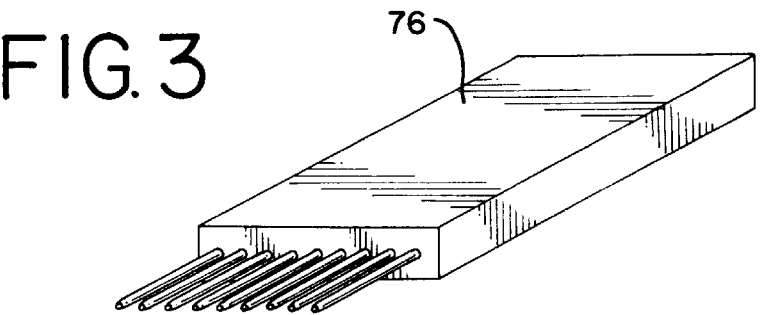
FIG. 3 is a perspective view of the storage device of FIG. 2.

A conventional PC Card hard disk is illustrated in FIG. 3. The PC Card hard disk preferably conforms to the PCMCIA Type III standard. Such PCMCIA card hard disks are commercially available from MiniStor, Maxtor, Integral, Kahluna, and Syquest. These PC Card hard disks are presently capable of storing approximately 100 Megabytes of data. In the preferred embodiment, both the navigation application program 66 and the geographical data set 70 are stored on the storage device 76. Storing both the application program and geographical data set on the storage device enhances the speed of operation of the navigation system 60 and permits updating both the navigation application program 66 and the geographical data set 70. The navigation application program may require approximately 2 MB of storage and the geographical data set may use the remainder of the storage capacity, e.g. approximately 80–95 MB. In alternative embodiments, the geographical data set 70 and the navigation application program 66 may be stored on separate storage devices or other writable or re-writable media, such as writable optical disks, hard drives, floppy disks, a fixed hard disk, etc., or may be stored on media that cannot be re-written such as CD-ROM's, as well as other storage media that may be developed in the future. The storage device may be removable from the vehicle or the navigation system, or the storage device may be non-removable.

Figure 4:
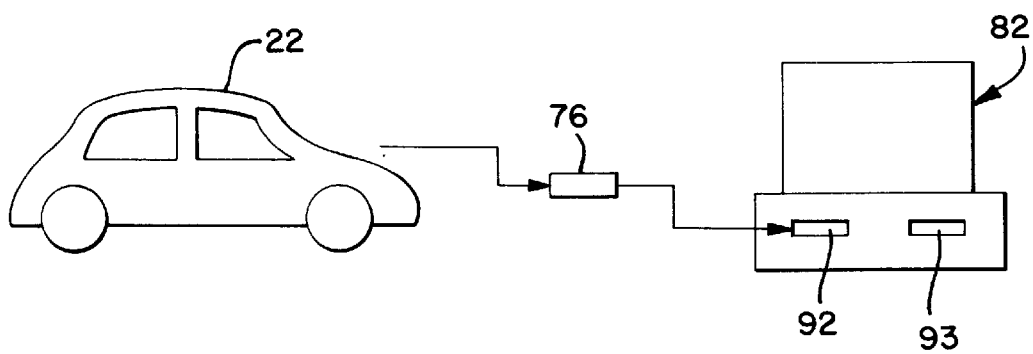
FIG. 4 is an illustration of the storage device of FIG. 3 along with a vehicle and local repository of FIG. 1.

According to a present embodiment, there is provided a system for updating, upgrading, replacing or repairing the navigation data, such as the navigation data set 70 and/or the navigation application program 66, stored on the storage device 76 in the in-vehicle navigation system 60. Referring again to FIG. 1, a plurality of local repositories 82, 84, 86, 88, and 90 are located in the geographical area 10. Each local repository (also referred to as a "kiosk") is equipped with the hardware and software to enable it to update geographical data sets and navigation application programs on the storage devices 76. In a preferred embodiment, the plurality of local repositories include dozens, hundreds, or even thousands of local repositories in each geographical area. Referring to FIG. 4, each local repository (such as local repository 82) has one or more drives or slots 92, 93 into which the storage device 76 can be received. Each drive 92 may be a conventional drive or slot for receiving PCMCIA cards. The local repository 82 has the appropriate hardware and software to read information from and write information to a PC Card hard disk inserted into the drive 92. To provide for updating, upgrading, replacing, or repairing the geographical data set 70, the storage device 76 is preferably removable from the vehicle 22, as illustrated in FIG. 4. (In an alternative embodiment, the in-vehicle navigation system 60 may include appropriate connection capability, such as a data port, so that the storage device 76 can be accessed by the local repository 82 via cabling without removing it from the vehicle.)

II. Local repository attributes and features

In one presently preferred embodiment, the local repository comprises a PC compatible computer having a 486DX2/66 or higher microprocessor, a hard disk drive of at least 200 MB, 16 MB of RAM, a VGA monitor, key locks for the case and for a 3.5" high-density floppy drive, a Databook PCMCIA socket (Model TMB-240), special rails, if needed, to mount the PCMCIA socket if installed in a 5¼" drive bay, one free ISA slot to install the PCMCIA controller card, one free ISA slot for an internal CD-ROM drive, one free serial port for a modem connection, one free parallel port, and a 14.4 Kbps or higher modem. The local repository should also include an appropriate operating system for running the PC compatible computer, such as either MS Windows 3.1x (and MS-DOS 6.x) or Windows 95. In addition, the local repository should include suitable drivers for the PCMCIA drive version such as Databook drivers 3.15 (shipped with Model TMB 240), local repository software (described below), appropriate security software to prevent unauthorized access to the local repository, and software for remote management. The local repository should have sufficient hardware performance to be able to perform an update the geographical data set and navigation application program on a storage device in a convenient amount of time, such as 20 minutes or less. The computer used for the local repository can either be dedicated solely to the process of updating storage devices, or it can contain additional software that is not related to the updating process.

Figure 5:
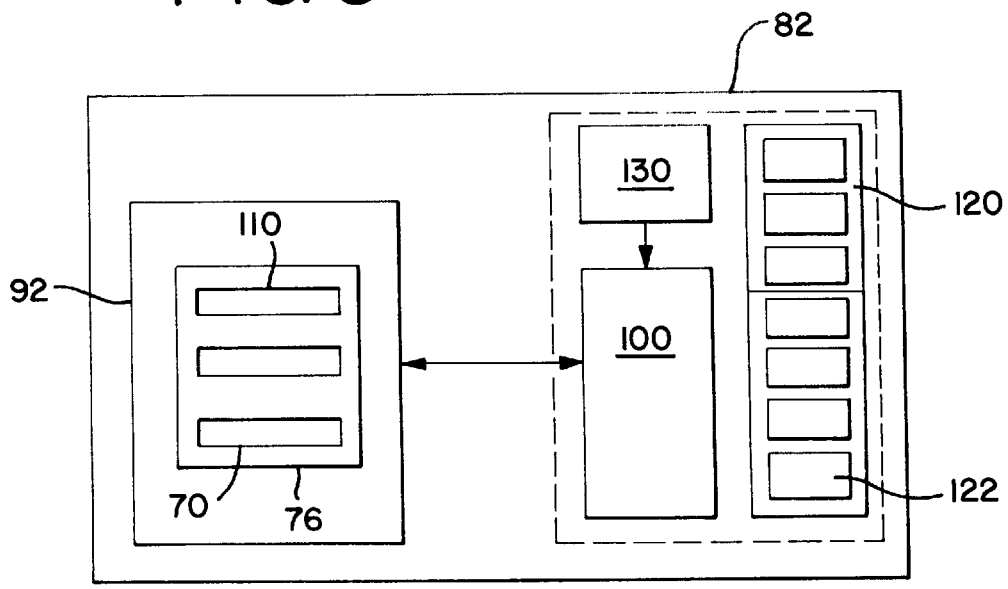
FIG. 5 is block diagram showing the information and programs on the local repository and storage device of FIG. 4.

Referring to FIG. 5, the local repository 82 includes copies of software, such as navigation programs and geographical data sets, required to upgrade and maintain the storage devices 76 containing the geographical data sets and navigation application programs used in in-vehicle navigation systems. The local repository 82 includes a main program 100 capable of reading the information stored on the storage device 76 that is received in the drive 92. For example, the main program 100 includes a routine that reads information from the storage device 76 to ascertain the types of navigation application program 66 and geographical data set 70 that are stored on the storage device 76.

In addition, the main program 100 includes a procedure that reads identification data 110 which may be stored on the storage device 76. The identification data 110 on the storage device 76 may include information about the versions of the geographical data set and navigation application program on the storage device, an update history of the geographical data set and application programs on the storage device, information about whether the owner of the vehicle has a valid subscription for an update, and so on. An encryption scheme may be used to hide the identification data 110 on the PCMCIA storage device 76.

As mentioned above, a plurality of current geographical data sets 120 are stored on a hard drive of the local repository 82. These geographical data sets 120 may include an updated version of the geographical data set 70 included on the storage device 76 of the in-vehicle navigation system 60. In a preferred embodiment, the local repository 82 may include different types of geographical data sets. For example, the local repository 82 may include both basic geographical data sets and enhanced data sets. A basic geographical data set may include information about roads, speed limits, intersections, stop lights, limited points of interest, etc. An enhanced geographical data set may include all the information as in the basic data set and in addition may include more detailed supplemental information about specific types of points of interests, such as restaurants, museums, hotels, health clubs, etc. The additional information included in enhanced geographical data sets may be provided by third parties, e.g. restaurant or hotel associations, etc. In addition, the local repository may include geographical data sets for other geographical areas. For example, if a vehicle owner who normally drives in one geographical area is planning a trip outside the geographical area, he might want to have the geographical data set for his destination area stored on the storage device 76. Alternatively, a person planning a road trip may want to have a geographical data set stored on his storage device that includes information for geographical areas along the way.

In addition, the local repository 82 includes an administration program 130. The administration program 130 allows an administrator-technician to access the local repository to update the geographical data sets and other information on the local repository on a regular basis. The local repository 82 may also include a means for communicating (such as a modem with appropriate software) with a central facility to enable the central facility to monitor operation of the local repository.

As mentioned above, updates or upgrades of the navigation application programs may also be available. Updated versions of navigation application programs 122 are also stored on the local repository. When a storage device is inserted into a local repository for updating, the main program 100 checks whether an updated version of the navigation application program is available for the navigation system from which the storage device was taken. If so, the main program automatically installs the updated version of the navigation application program along with the updated geographical data sets, preferably without the need for any input by the local operator.

In order to make it convenient for an owner of an in-vehicle navigation system to update the navigation data on his storage device, the local repositories 82, 84, 86, 88, and 90 are located at numerous places in the geographical area 10, such as automobile dealerships, car rental agencies, auto clubs, automobile fleet operations, travellers service providers, oil change shops, auto repair shops, etc. In a present embodiment, each of the local repositories may be operated by a person who is employed at the location where the local repository is located (a "local operator"). The local operator performs the day to day updates of navigation data on the storage devices brought into the location by vehicle owners who have in-vehicle navigation systems. (In an alternative embodiment, the vehicle owner may access a local repository directly without the assistance of a local operator.)

In a preferred embodiment, the local repository should be easy to use so that the local operator can quickly and easily update storage devices. The local operator is given appropriate training and written instructions. The local repository preferably includes a graphical menu system including prompts that default to selections the local operator may want to choose, or those previously chosen by the vehicle owner. Should complications arise, the local operator may call a help desk at a regional or central facility. In a present embodiment, the local operator has access to only certain functions, such as writing a new storage device and updating an existing storage device. The local operator would not generally have access to certain of the administrative functions, described below.

Since the local repositories may be located in various environments, it is preferable that each local repository include built-in security features. For example, the local repository should have a means to prevent users from accidentally modifying or deleting system files. In addition, the local repositories may include security features, such as password access, locks on the case, and file encryption, so that unauthorized persons cannot access the software and/or data files stored on the local repositories.

If the storage device used in the in-vehicle navigation system is not re-writable, such as a CD-ROM, the local repository may include appropriate hardware and software to store all the necessary data on a new storage device which is provided to the vehicle owner as a replacement for his old storage device. For example, if the storage device used in the in-vehicle navigation system is a CD-ROM, the local repository may include a drive for reading the vehicle owner's old CD-ROM and for writing an updated navigation application program and/or a geographical data set on a new CD-ROM. The equipment for writing new CD-ROM's is well known. The updating process for replaceable media would otherwise be similar to the process for re-writable media.

III. The methods of operation

A. Storing updates on local repositories

Because many vehicles are expected to be driven primarily within only one geographical area, many in-vehicle navigation systems include detailed navigation information relating to only a single geographical area of the country or adjacent geographical areas. This provides a number of advantages. First of all, it permits the navigation application program to run faster since it does not have to search through a large data file that includes information related to distant parts of the country. Furthermore, limiting each of the geographical data sets to only a single geographical area or only a few geographical areas better utilizes the available hard disk capacity of the in-vehicle storage device by providing a higher level of detail for a single geographical area or a few geographical areas rather than a lower level of detail for many geographical areas.

In-vehicle navigation systems may be customized so that each vehicle owner may have specifically desired geographical data information and other supplemental information that makes the system useful personally to each vehicle owner. For example, a vehicle owner may want information relating to only one geographical area or may want information for a few adjacent geographical areas. Also, the vehicle owner may want certain data supplements, such as locations of restaurants, hotels, etc. The geographical data sets used in in-vehicle navigation systems are similarly organized. A geographical data set may be configured to include a single geographical area, i.e. that includes information relating to points of interest in only a single geographic area. Alternatively, a geographical data set may be configured so that it includes information about several geographical areas for those owners of in-vehicle navigation systems who want to use their vehicles in those geographical areas. Also, a geographical data set may be configured as an enhanced geographical data set that includes supplemental classes of information, such as third party information about restaurants, hotels, ski resorts, etc. The number of geographical areas and enhancements that can be included in a geographical data set that is stored on a vehicle owner's storage device is limited by the available capacity of the storage device.

Geographical data sets for various geographical areas, and combinations of geographical areas, and enhanced data sets may be available on local repositories. Geographical data sets for distant geographical areas may be available for vehicle owners who want to take road trips to such geographical areas, or who regularly travel to other geographical areas. Also, special country-wide or region-wide geographical data sets can be made available that include navigation information for many geographical areas, but with less detail (such as only interstate or main highway routes).

In a preferred embodiment, updated information relating to all the geographical areas of a country is continuously being collected at a central geographical data set production facility. Referring to FIGS. 6A and 6B, as updated geographical information for all geographical areas is obtained, it is stored in a master file at a central facility (FIG. 6A, Step 200). The central facility preferably also includes files on the regional geographical data file configurations and coverage areas. Updates for all the different geographical areas in the country are produced on a regular and preferably rotating basis at the central facility by preparing new versions of all the geographical data sets. Copies of the updated geographical data sets for different regions of the country may be stored on a CD-ROM or other suitable storage media (FIG. 6A, Step 202). Collections of updated geographical data sets on CD-ROM are prepared as field office master copies (FIG. 6A, Step 203). A similar updating process may be applied to updates or upgrades of the navigation application programs. A package containing master copies of the updated geographical data sets and navigation application programs is prepared for a geographical region (FIG. 6A, Step 204). The package may include updated geographical data sets for more than one geographical area. The package of master copies is sent by mail, courier, or other suitable means, to a regional facility or field office in the geographical area (FIG. 6B, Step 205). Packages of the updated geographical data set files and navigation application programs may also be sent to regional facilities or field offices located outside the affected geographical area for the benefit of vehicle owners in such other geographical areas who might be planning trips to the affected geographical area.

After the package of updated geographical data sets and navigation application programs is received in the regional or field office, the updated geographical data set files and application programs are installed in the local repositories in the geographical area. Using a list 209 (FIG. 6B) of all the local repositories in the geographical area, an administrator-technician physically visits each of the local repositories (FIG. 6B, Step 208). In a preferred embodiment, all of the local repositories located in a geographical area affected by an updated geographical data set receive updates of the geographical data sets for that geographical area. As mentioned above, the local repositories may be located at automobile dealerships, rental fleets operations, package delivery fleets, travelers clubs, retail businesses, etc. The visits by the administrator-technician may occur on a regular basis, e.g. approximately every three months, as updated geographical data set files and applications are prepared and released.

When the administrator-technician visits each of the local repositories, he loads the updated geographical data set files and navigation application programs from the master copy onto the local repository (FIG. 6B, Step 210). In one embodiment, the updated data set files and applications are stored on a CD-ROM which is inserted into the CD-ROM drive of the local repository. Alternatively, master copies of the updated data set files may be stored on PC Cards brought by the administrator-technician that can be inserted into the drive 92, or alternatively, the updates of the geographical data set files and applications may be loaded onto each local repository by linking the local repository with cabling to a portable computer carried by the administrator-technician.

In order to load the geographical data set files and applications, the administrator-technician accesses the administration program 130 stored on each local repository. The steps performed by the administration program 130 when accessed by the administrator-technician to install the updated geographical data set files and application programs are shown on FIGS. 8H–8L, and in particular, FIGS. 8J–8L.

After the updated geographical data set files and navigation application programs have been successfully installed onto all the local repositories, both the geographical data sets and navigation application programs are configured to make them available for distribution to vehicle owners. The local repository program verifies that the new geographical data sets and navigation application programs are installed properly by running integrity checks. Once the verification is complete, the local repository communicates by modem to the central facility 214 to confirm that the updates have been successfully installed and configured (FIG. 6B, Step 212). In addition, the administrator-technician returns the master copy of the updated geographical data set files and navigation application programs to the field office (FIG. 6B, Step 211). In addition, the local repository updates a local configuration file to reflect the current status of the versions of the geographical data sets and navigation application programs on the local repository.

B. Updating vehicle owners' storage media

In order for a vehicle owner to use the system of local repositories to update his geographical data set or navigation program, it is assumed that the vehicle owner already has an in-vehicle navigation system installed in his vehicle and that the navigation system included original or prior versions of the geographical data set or navigation application program on a re-writable storage medium. In a preferred embodiment, the local repository is able to handle updates for navigation systems and navigation application program manufactured by different companies. In addition, in order to be entitled to obtain updated versions of the original geographical data set at a local repository, the vehicle owner would have to have obtained a subscription to or license for the updated geographical data set files. In a preferred embodiment, a vehicle owner would have been given an opportunity to sign up for a subscription for geographical data set updates when the in-vehicle navigation system was initially obtained, either with the purchase of a new automobile or when the in-vehicle navigation system was first installed. For example, subscriptions could be available on a yearly basis that would entitle the vehicle owner to all the updates for one or more of the geographical areas and/or enhanced data sets that become available during the year. Subscriptions for other periods of time may also be available, or alternatively, subscriptions for a certain number of updates may be available.

Figure 7:
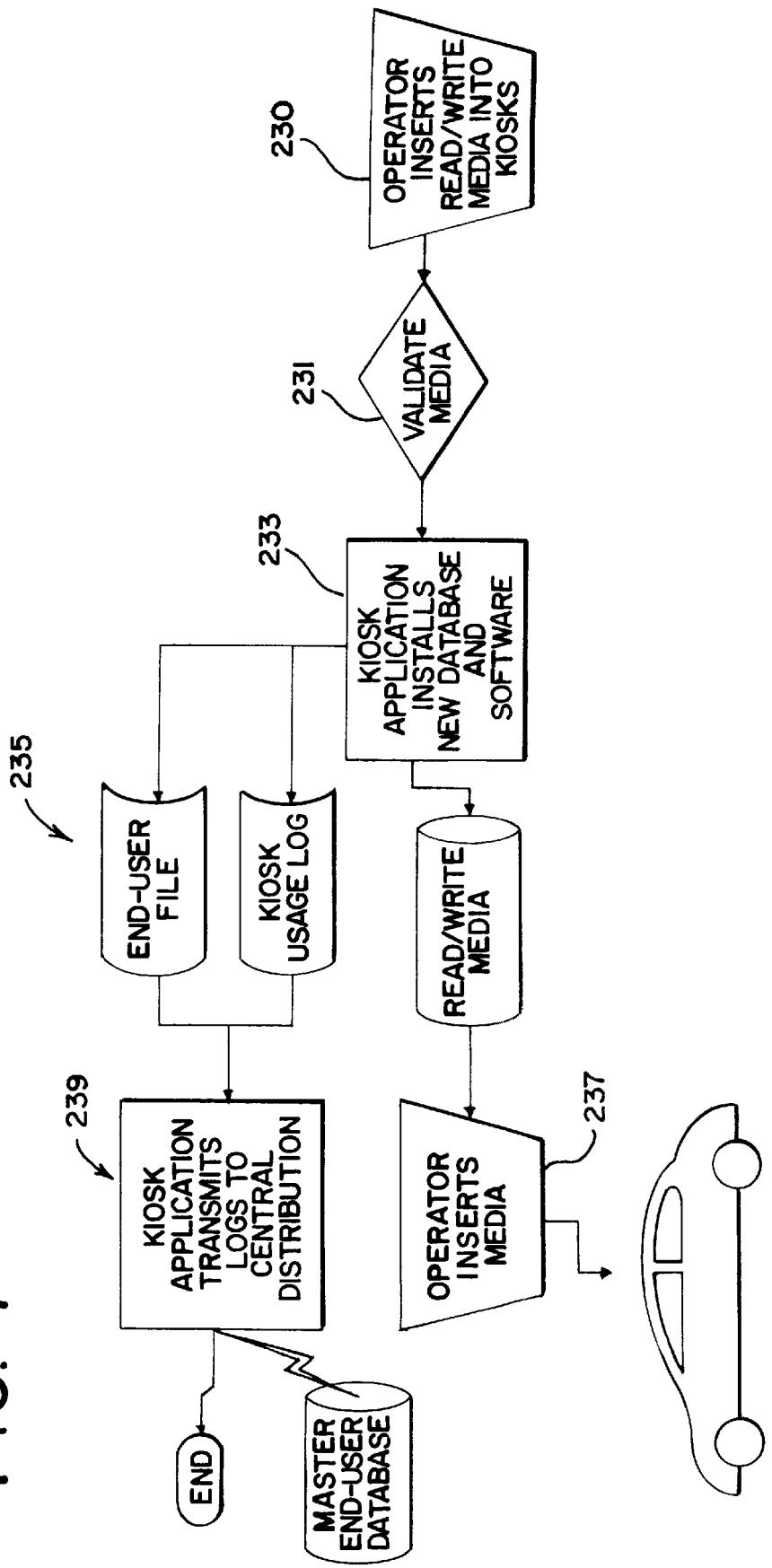
FIG. 7 is a flow chart of the steps for installing updated data on the storage device of a vehicle owner.
Figure 8A:
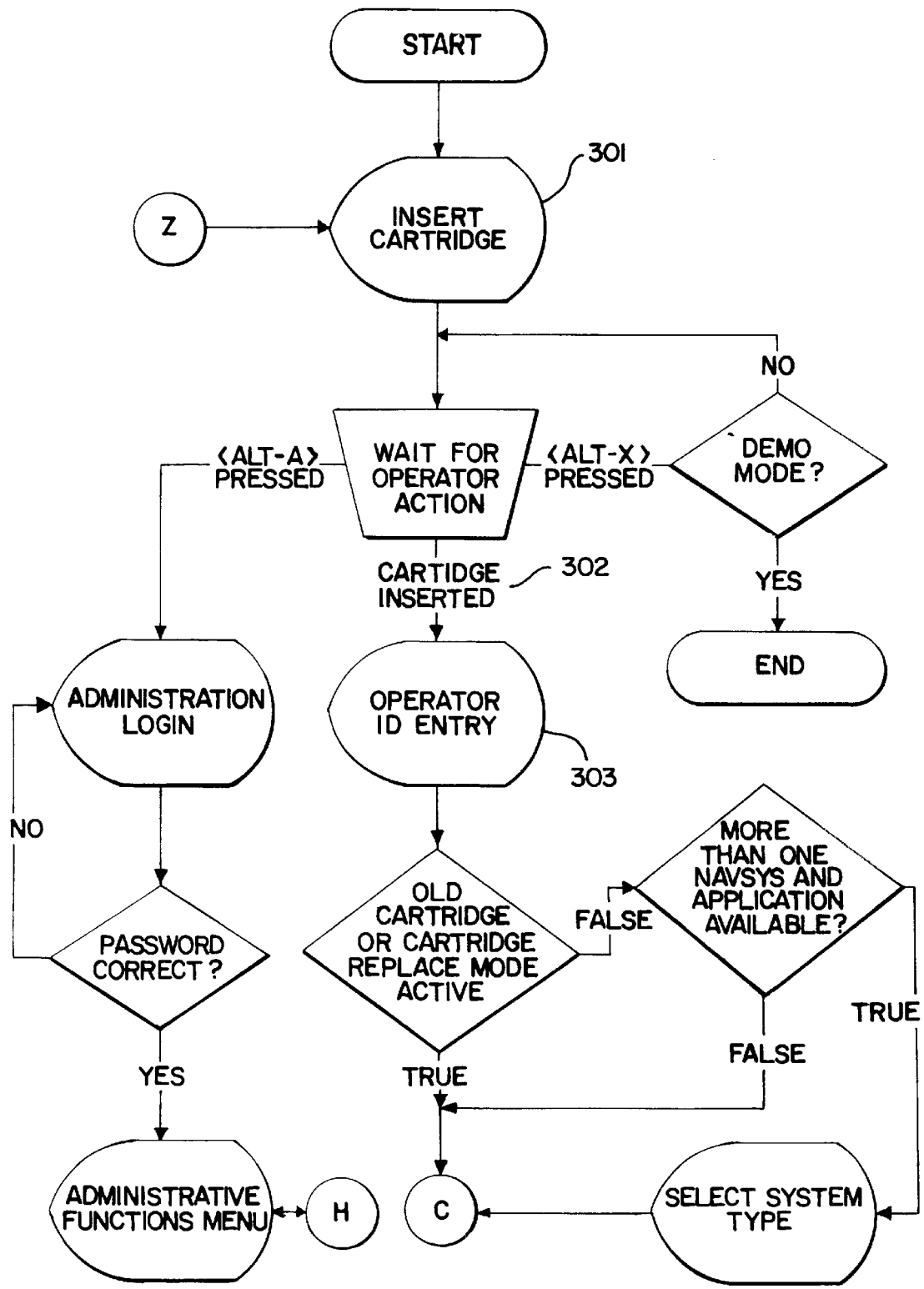
FIGS. 8A–8L are flow charts detailing the steps performed by the local repository to perform various functions, including those illustrated in FIGS. 6A, 6B, and 7.
Figure 9:
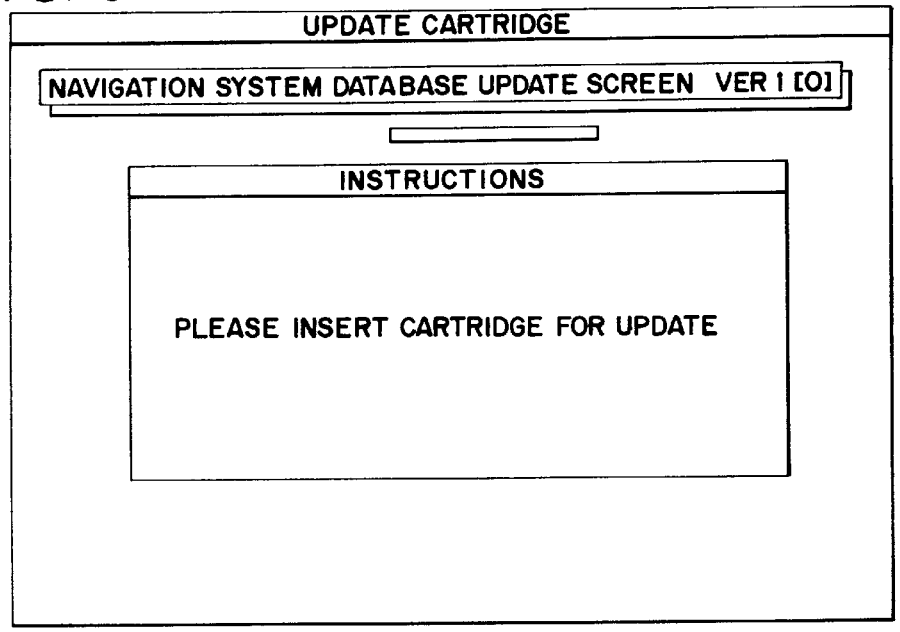
FIG. 9 shows a sample display on the local repository prompting initiation of an updating procedure for a storage device.

Referring to FIGS. 2, 4 and 7, when the vehicle owner wishes to obtain an update of his geographical data set or navigation application program, he drives his vehicle to a location having one of the local repositories. The locations of local repositories may be included as points of interest (POI's) in the vehicle owner's existing geographical data set 70 so that the navigation system 60 can assist the vehicle owner in finding them. When the vehicle owner is at a local repository location, the local operator removes the storage device 76 from the vehicle and inserts it into the drive 92 of the local repository (FIG. 7, Step 230). (As mentioned above, the operator may be an employee or owner of the business at the location where the local repository is located. Alternatively, the vehicle owner may remove the storage device 76 from the vehicle himself and insert it into the drive of the local repository. Also, the storage device 76 may be connected to the local repository by means of cabling without removing it from the vehicle.) Referring to FIG. 8A, Step 301, and as shown in FIG. 9, the display of the local repository may include instructions requesting the insertion of the PC Card into the drive 92.

When the storage device 76 is inserted into the local repository, the main program 100 begins. (In one embodiment, a program loop may continuously attempt to read from a device in the slot 92 until one is inserted so that the main program executes automatically upon insertion of a storage device.) In a preferred embodiment, when the PC Card is inserted into the slot of the computer, an interrupt is generated that is detected by the operating system of the computer. The interrupt causes the operating system to automatically read information from the PC Card to identify the type of media in the drive. The main program 100 includes three main procedures or routines: a validation procedure (FIG. 7, Step 231), a copying procedure (FIG. 7, Step 233), and a logging procedure (FIG. 7, Step 235). During these procedures, the main program 100 prompts the local operator for the necessary inputs to enable the geographical data set 70 and navigation application program 66 on the storage device 76 to be updated, if necessary. The detailed steps carried out by the main program 100 to update the data on the storage device 76 are included in the flow charts of FIGS. 8A–8G. The main program 100 may include several related programs, and associated files and software tools. The main program may be written in any suitable programming language, such as C++, Basic, etc. The source code for one embodiment of the main program is included in Appendix A of the microfiche appendix of this specification.

The validation procedure 231 includes several parts. The validation procedure includes routines that confirm that an authorized local operator is using the local repository, that the storage device is subject to a subscription that entitles it to be updated, and that the storage device is not defective. Briefly, when a storage device is inserted into the drive 92 of the local repository, the main program 100 on the local repository detects that a storage device has been inserted into the drive (FIG. 8A, Step 302). For auditing purposes, the validation procedure 231 requests the local operator to enter an ID before continuing with the updating process (FIG. 8A, Step 303). (The ID entered by the local operator is validated against a list of valid operator ID's that have been setup and maintained through the administrative functions, shown in FIG. 8H and described below.)

Figure 8D:
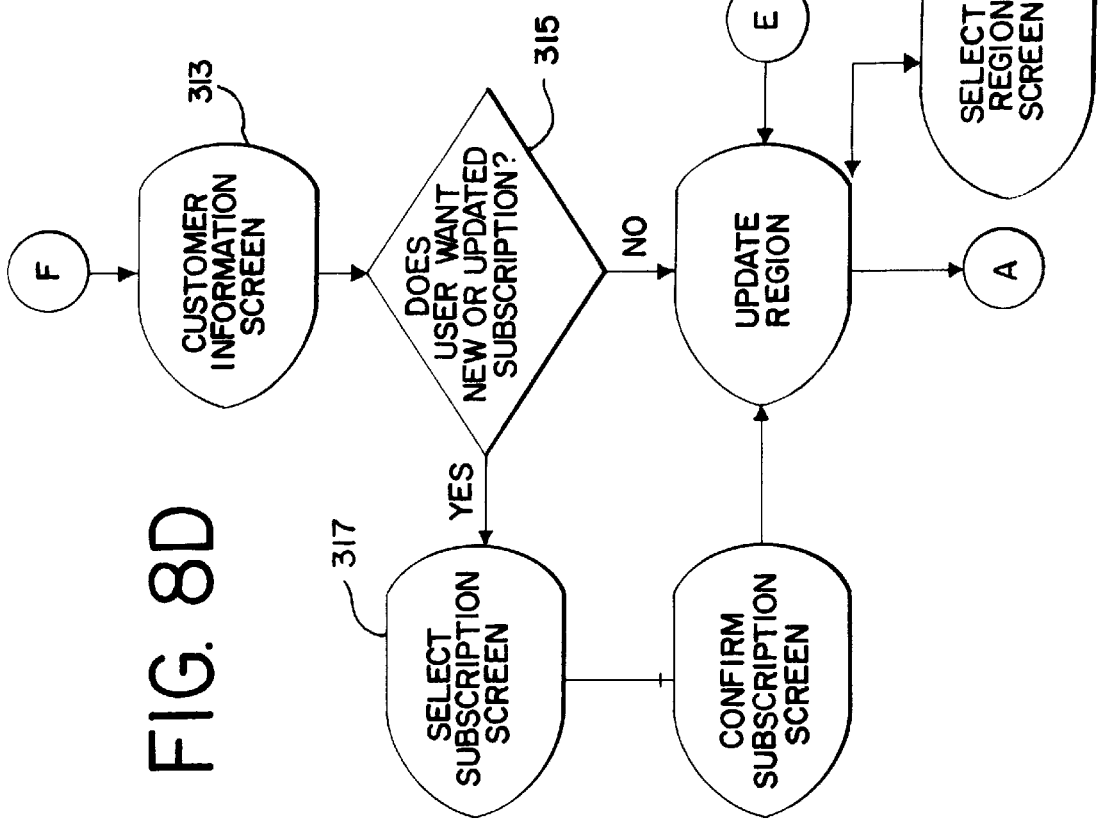
Figure 8B:
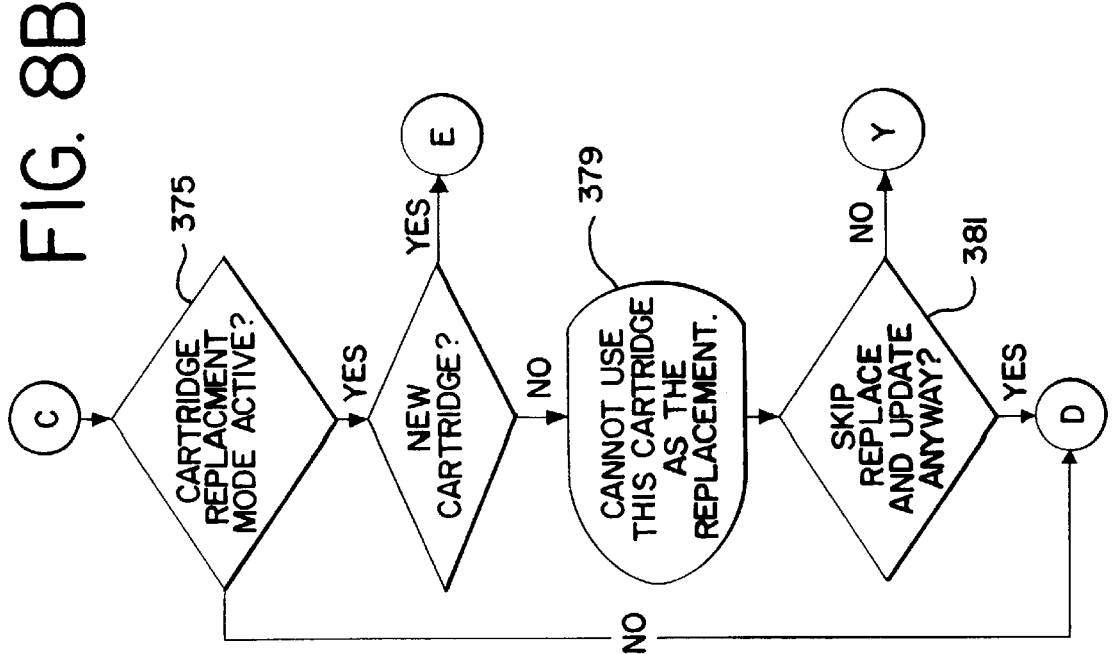
Figure 8C:
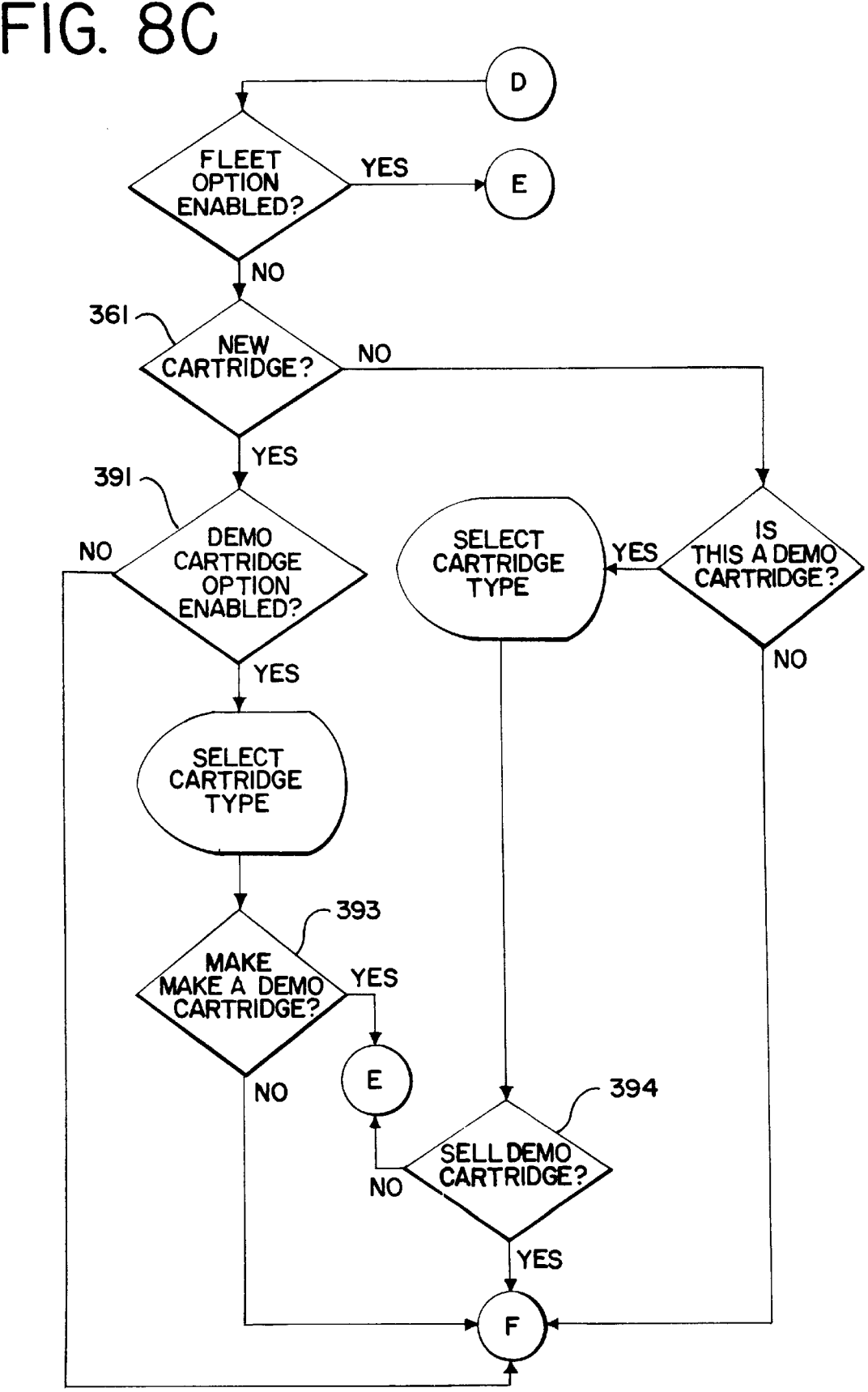

After the local operator enters a valid ID, the validation procedure checks for cartridge ID and user information. To do this, the local repository attempts to read information off the storage device, and in particular, the local repository attempts to read the identification data 110 from the PC Card. If all the fields of identification data 110 have already been stored on the storage device, they may be displayed to the operator by the local repository (FIG. 8D, Step 313). This identification data 110 may include the navigation system code, name of the geographical data set file, version of the geographical data set file, version of navigation system application program, subscription type, initial subscription start and end dates, warranty start and end dates, and cartridge ID serial number. The identification data can then be verified by the local operator. If any required identification data 110 is missing, the local operator obtains it from the vehicle owner or from the central facility to complete the validation procedure. If information such as a customer ID is missing from a storage device, the local operator may call customer service at the central facility to confirm that the vehicle owner is entitled to update his geographical data set file. The central facility may provide any required information to the local operator. The local operator then enters this information into the local repository when prompted to allow the validation process to continue. The information entered into these fields by the local operator is saved onto the storage device.

The validation procedure ensures that the local operator has entered appropriate information into all the required fields and that the media is under a valid subscription prior to proceeding. The identification data 110 may be included on the re-writable hard disk portion of the PC Card storage device or alternatively may be stored on the re-writable EPROM memory that is separate from the hard disk of the PC Card. This re-writable EPROM is used by the PC Card to store information about the PCMCIA device, such as the manufacturer and part number, and may also be used to store additional information, such as plug-and-play information, serial number, and so on.

Next, the validation procedure determines if the vehicle owner is covered by a subscription plan based upon the user information read from the storage device. The user may be provided with an opportunity to renew or upgrade his subscription (FIG. 8D, Step 315). If the vehicle owner's subscription plan has expired, the vehicle owner may purchase a new subscription from the local operator.

Figure 8E:
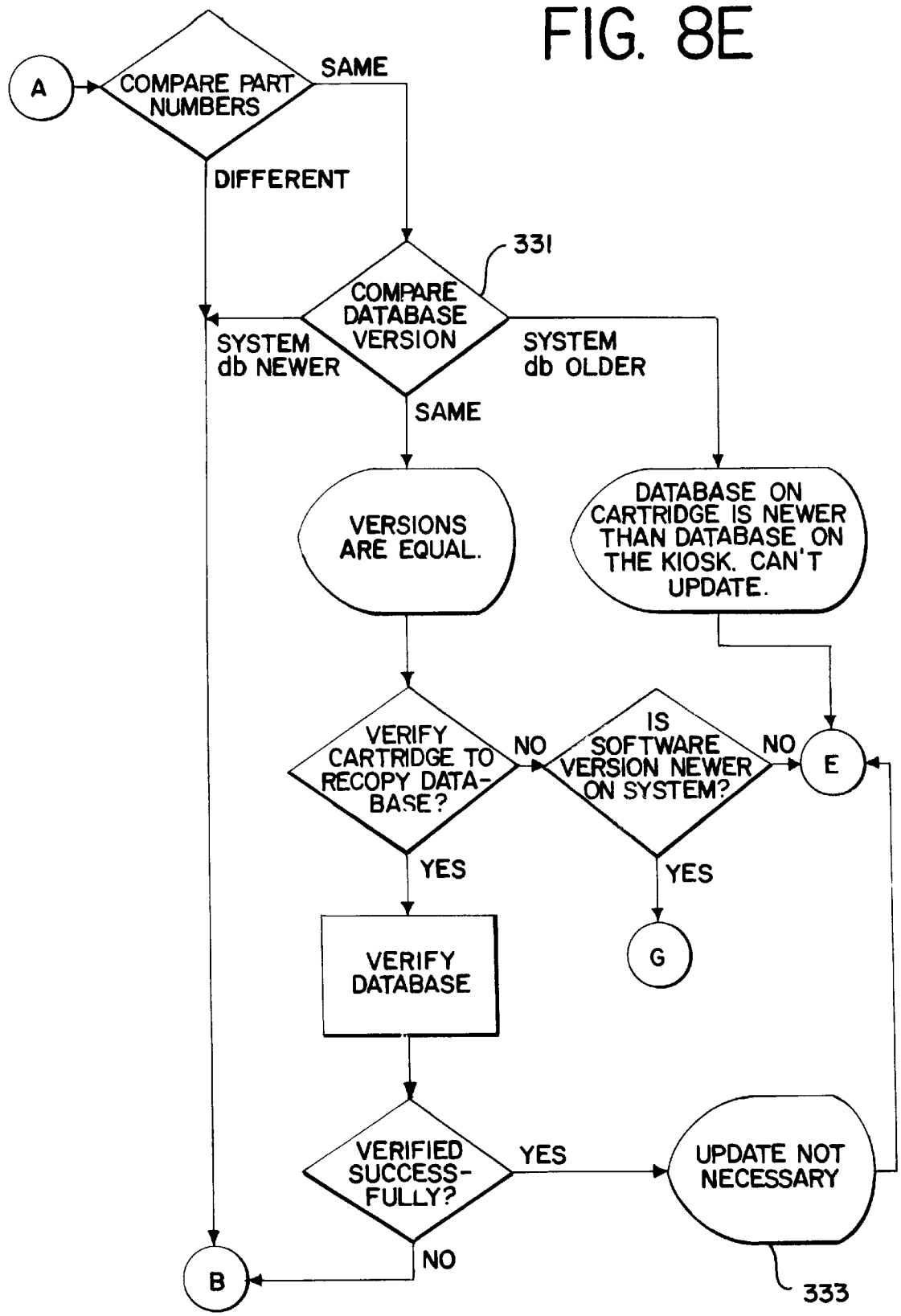
Figure 10:
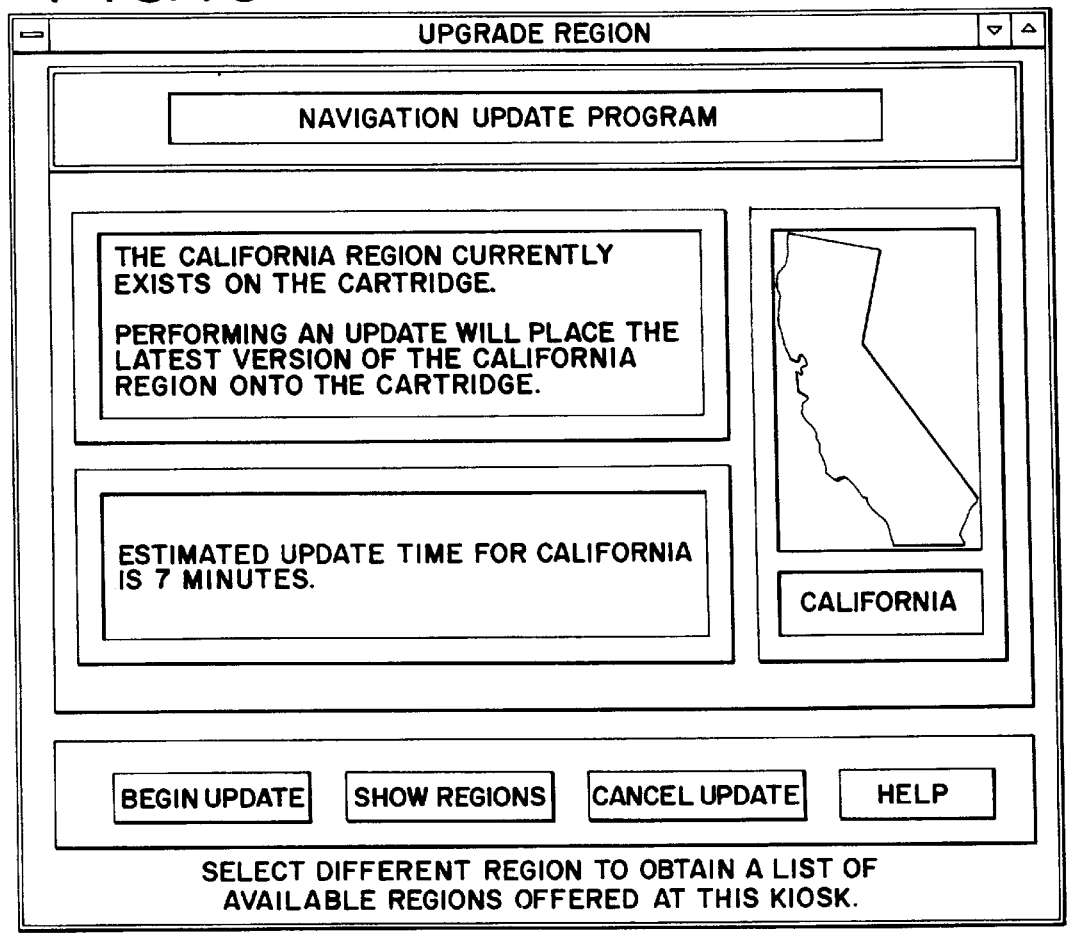
FIG. 10 shows another sample display shown on the local repository during the updating procedure.

After the validation procedure, the main program 100 proceeds to the updating procedure. Preferably, the program defaults to check first the currently installed geographical data set. Since local repositories may be used to update several types of in-vehicle navigation systems, the main program automatically detects the type of navigation system that is currently installed on the vehicle owner's storage device and configure the screens and options available so that appropriate choices compatible with the navigation system are displayed. Before beginning the update process, the local repository verifies that the versions of the software on the storage device are different than those on the local repository. Referring to Step 331 in FIG. 8E, the local repository program compares the geographical data set and the navigation application program that are already on the storage device to the versions on the local repository to determine whether they are the same. If the versions of the geographical data set and the navigation application programs on the storage device are the same as the latest versions on the local repository, the local repository program prompts the operator that there is no need to upgrade the storage device and that it can be removed from the local repository and inserted back into the vehicle (FIG. 8E, Step 333). If the versions of the geographical data set or application are different, the local repository displays that an update is available for the vehicle owner (FIG. 10.). The local repository program may also display the time required to perform the update.

The vehicle owner may also have the option of selecting additional or different geographical areas or supplemental data to be included in the updated data set to be copied onto the storage device, depending on the vehicle owner's subscription which may be expanded at the time of updating of the storage device. The local repository displays a listing of regions or geographical areas that are available on the local repository, and may also display a listing of supplemental data that include additional points of interest and third party information (FIG. 8D, Step 216 and FIG. 11). The local repository program requests the selection of additional regions and supplemental data, within the subscription coverage, to copy onto the storage device. The vehicle owner selects the desired geographical areas and supplemental data and confirms the selection.

Figure 8G:
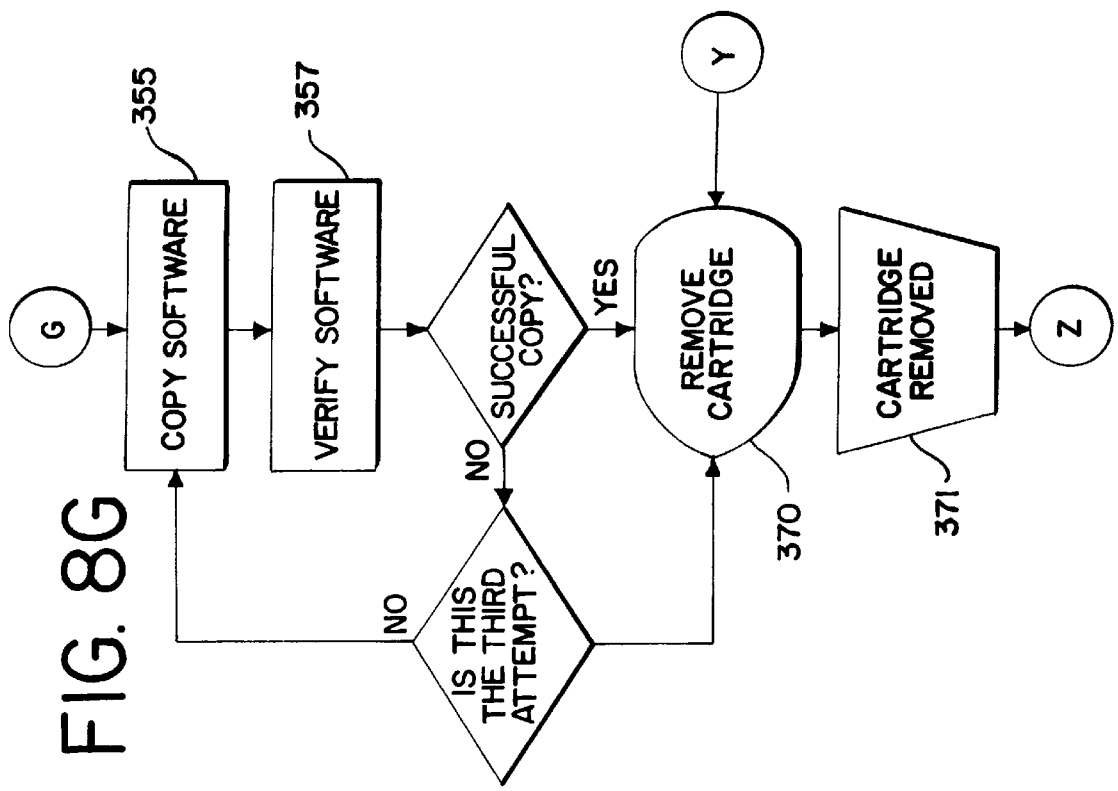
Figure 8F:
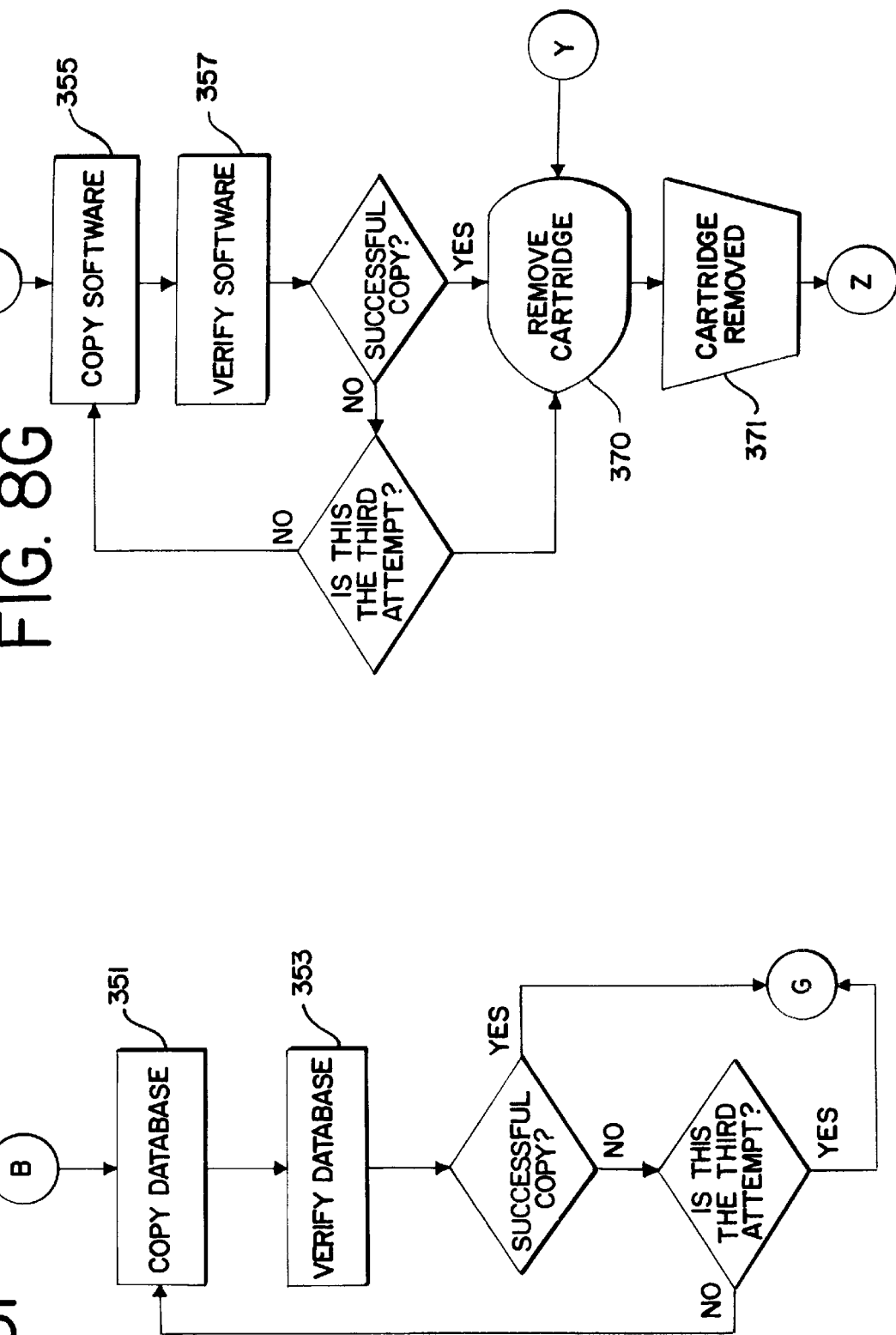
Figure 8H:
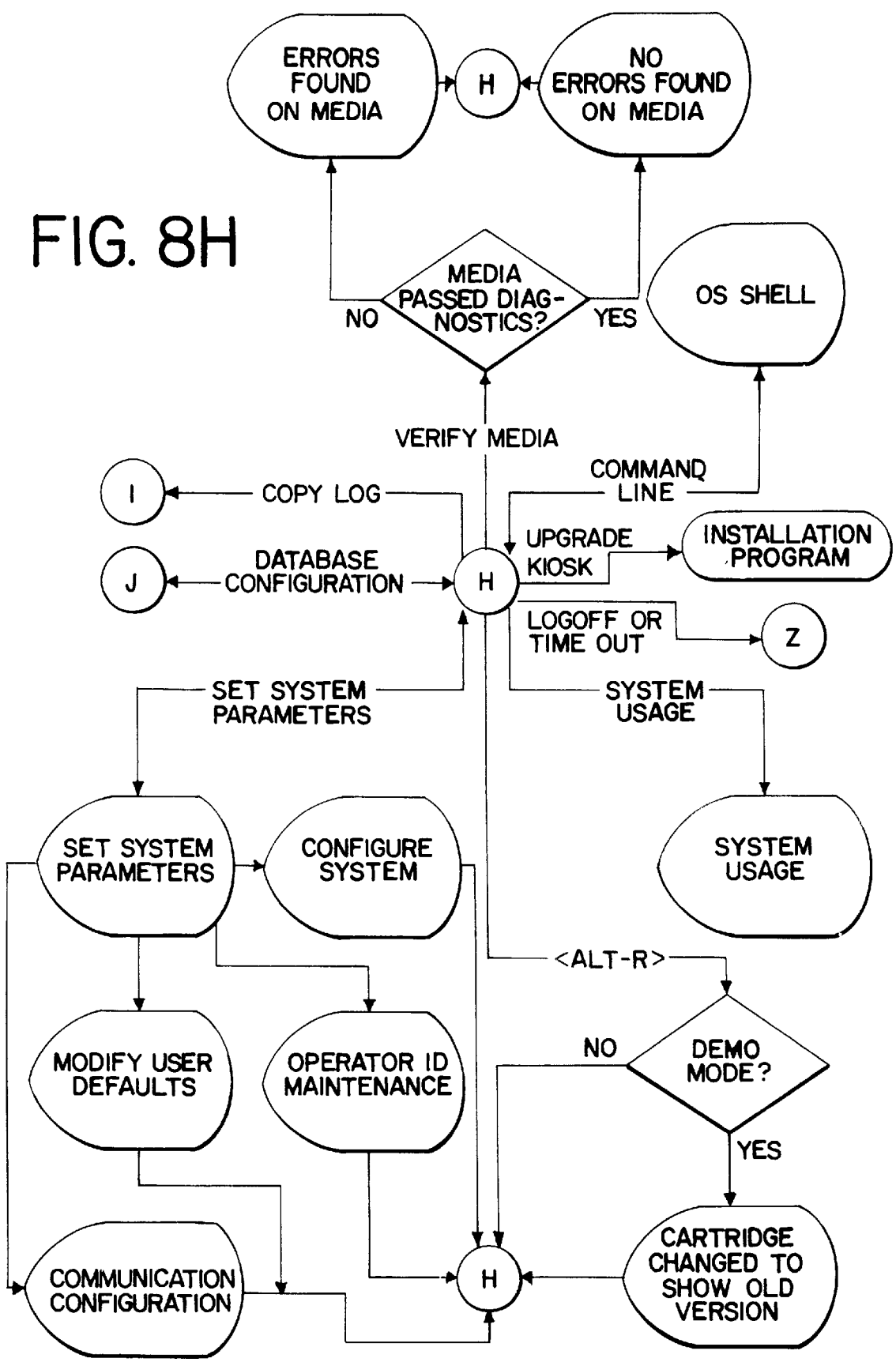

The coverage area(s) selected by the vehicle owner along with any updates to the navigation application programs are then copied from the local repository onto the storage device. In a preferred embodiment, the prior versions of the geographical data set and navigation application programs on the storage device are overwritten with the new versions. First, the updated geographical data set including the selected coverage areas is copied to the storage device (FIG. 8F, Step 351). As the copying is being performed, the local repository verifies the integrity of the storage device and validates the copied geographical data (FIG. 8F, 353). After the geographical data is successfully copied, the local repository proceeds to copy the updated navigation application program, if available, to the storage device (FIG. 8G, Step 355) and verifies the copying of this program (FIG. 8G, Step 357). The full update process for the geographical data set and navigation application program may take approximately 20 minutes, depending on the amount of software to be written and the size of the storage device. The local repository may indicate the percentage of the update that is complete by displaying messages along with a status bar. Information about the updating transaction, such as date of updating, local repository location, geographical regions included in the data set, versions of updated geographical data and application program, defective cartridge replacement (if any), subscription term extensions, etc., may be stored on the storage device as identification data 110, preferably on the EPROM of the device. If there are any problems with the updating procedure, the local operator may follow the procedures for handling defective media, described below, or may consult a help desk or guide located either at the location of the local repository or remotely by telephone.

When the storage device has been successfully updated with new versions of the geographical data set and navigation system application program, the local repository program prompts the operator to remove the storage device and place it back into the vehicle (FIG. 8G, Step 370). The operator or the vehicle owner then removes the storage device from the drive 92 of the local repository and re-installs it into the navigation system in the vehicle (FIG. 7, Step 237 and FIG. 8G, Step 371). At this time, the operator may also place a label on the navigation unit and/or the storage device to indicate the date of the latest update of the navigation system. The operator may provide the vehicle owner with a printed document describing the new features in the update.

Upon completion of the updating procedure for each storage device, the local repository program stores information in a history file on its own hard disk to maintain a log regarding all updating transactions (FIG. 7, Step 235). Information written to the history file may include the date and time of all update activities, customer ID's, cartridge ID's, geographical data set file names, old and new geographical data set file versions, old and new navigation application program versions, navigation system types, vehicle owners' information, subscription information and status messages.

The embodiment described above has several distinct advantages. For example, it permits tailoring the updated geographical data set to the specific needs of each vehicle owner. Since different vehicle owners may have geographical data sets that correspond to different regions of the country or that include different collections of supplemental data, the local repository can automatically tailor the updating process for the specific geographical data and enhancements that a vehicle owner has chosen to include in his vehicle. In addition, the present embodiment permits a vehicle owner to change the geographical regions to be included in his navigation system, as well as updating them. The present embodiment permits a vehicle owner to customize his navigation system and upgrade the system over time to provide supplemental information as it becomes available.

Still another advantage is that the local repository can check the customer subscription records before updating the vehicle owner's storage device to make sure that the vehicle owner is entitled to obtain updated software.

Another advantage of the system described above is that it permits the reuse of the PCMCIA cards on which the data is stored. Presently, these cards are relatively expensive (approximately $250 each). Further, if any PCMCIA cards become unusable, they can be replaced at the local repository (as described further below).

Still another advantage is that the local repository can also update or upgrade the navigation system application programs, if necessary.

C. Updating geographical data sets for fleet operations

The above described method for providing updated geographical data sets for in-vehicle navigation systems may be used by operators of fleets of vehicles that have in-vehicle navigation systems, or alternatively, fleet owners may use a similar system with some modifications tailored especially for such operations. Fleet operators may include car rental agencies, delivery truck services, limousine operators, and so on.

Fleet operators may have their own local repositories located at fleet parking lots or service facilities. A fleet operator may obtain a license to updates for an entire fleet of vehicles instead of separate subscriptions for each vehicle. Therefore, the program on the local repository may not require a local operator to enter vehicle owner or subscription information. Instead, the local repository program for a fleet would automatically update the geographical data set file on a storage device upon insertion, provided the storage device was registered to a fleet vehicle. Under normal circumstances, the only action the local operator would need to perform at a fleet location is to insert and remove the storage device from the local repository.

The local operator at a fleet operation may place a label with the date an update was performed on an easily observable portion of the in-vehicle navigation system to help identify vehicles that are due to be updated.

A fleet car, such as a rental car, may be returned to a location other than the one from which it was originally rented. The return location may be in a geographic area other than the geographical area covered by the geographical data set installed in the vehicle. During the update process for a fleet vehicle at a rental location, the main program on the fleet local repository may notify the local operator that the storage device has a geographical data set file for a different geographic location and prompt the operator to confirm whether he wants to proceed, and thus, change the data set for the current geographical location of the vehicle.

Figure 12A:
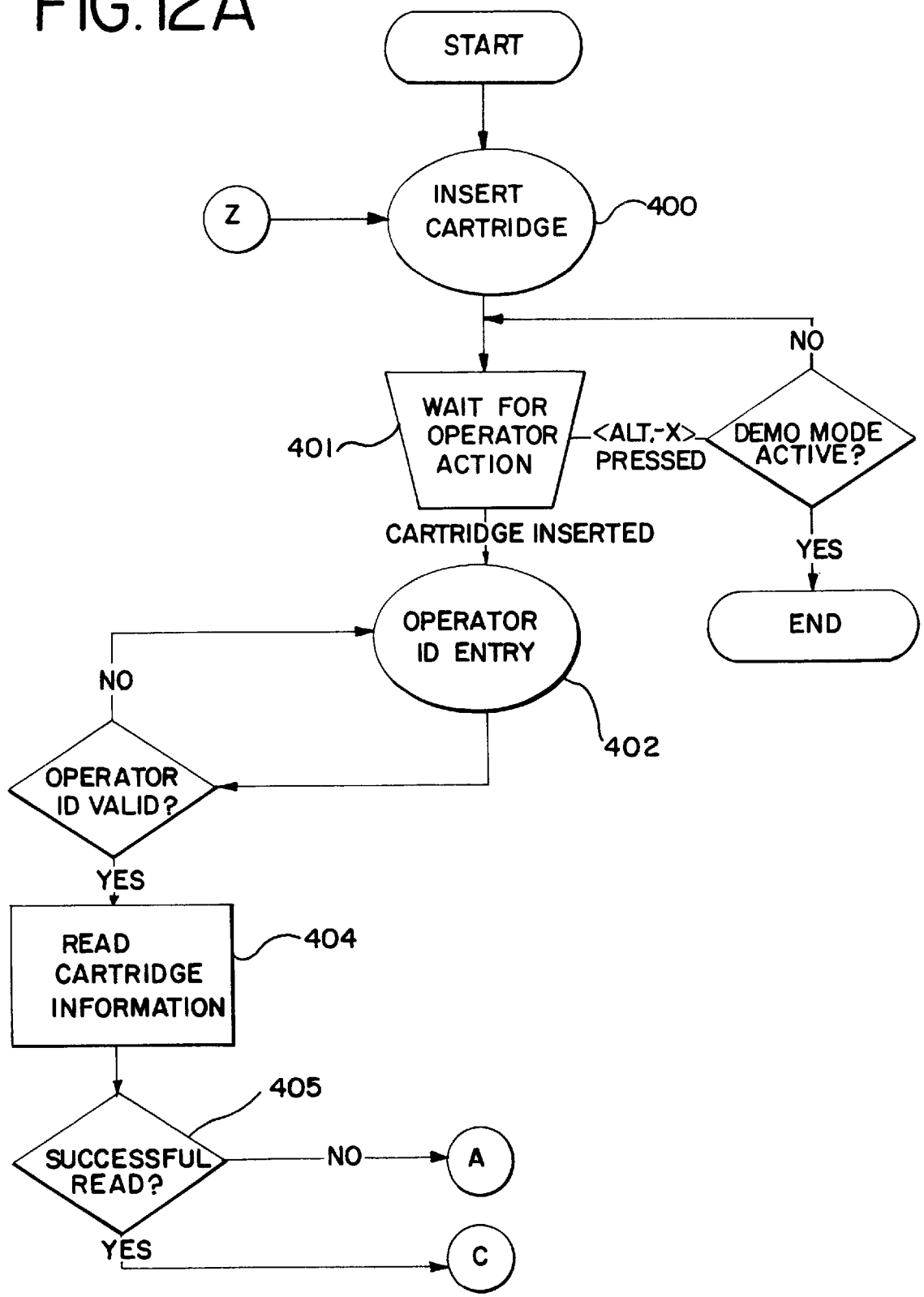
FIGS. 12A–12I are flow charts including the steps performed by the local repository to perform various functions for a fleet operation.
Figure 12B:
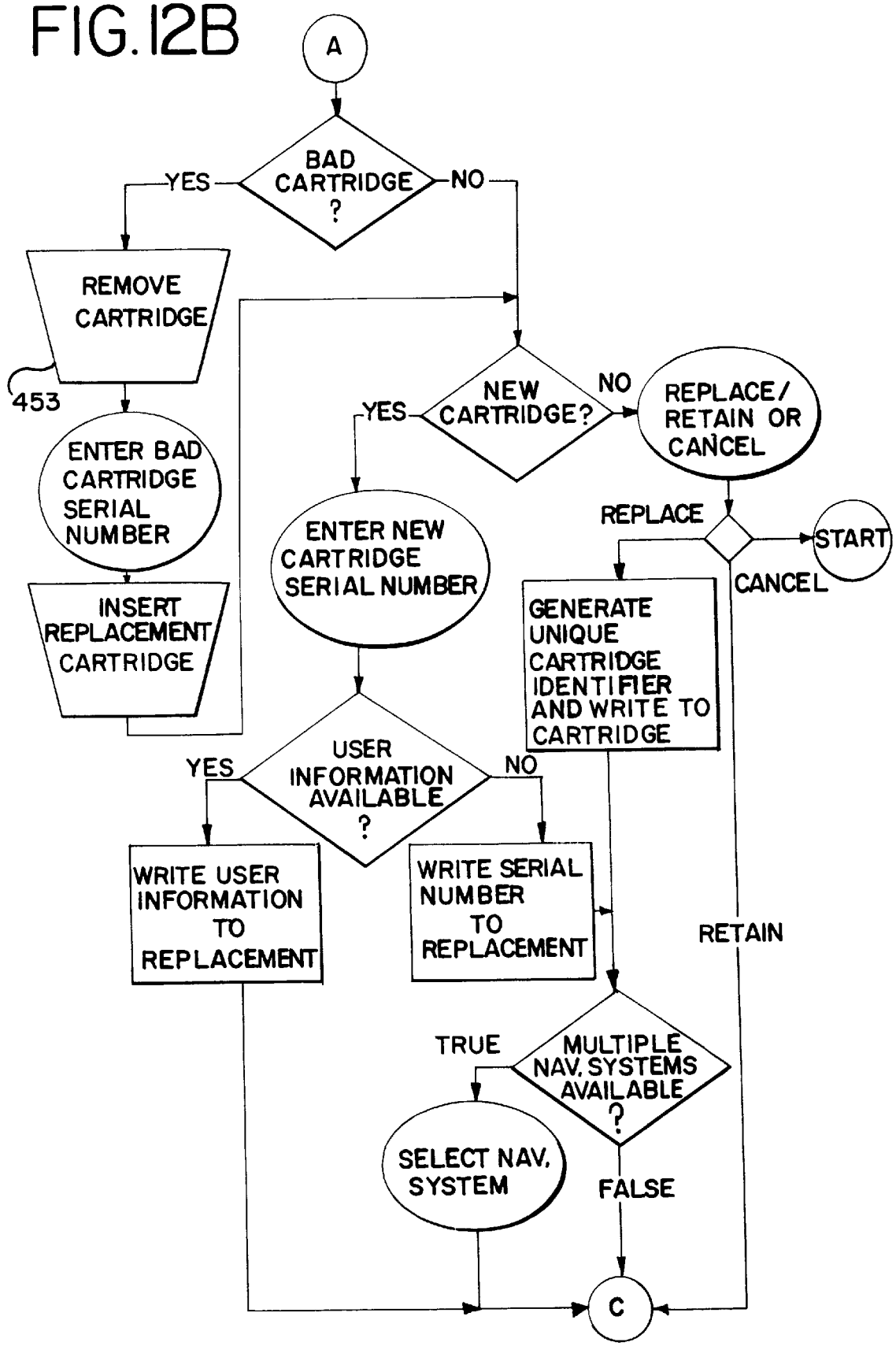
Figure 12C:
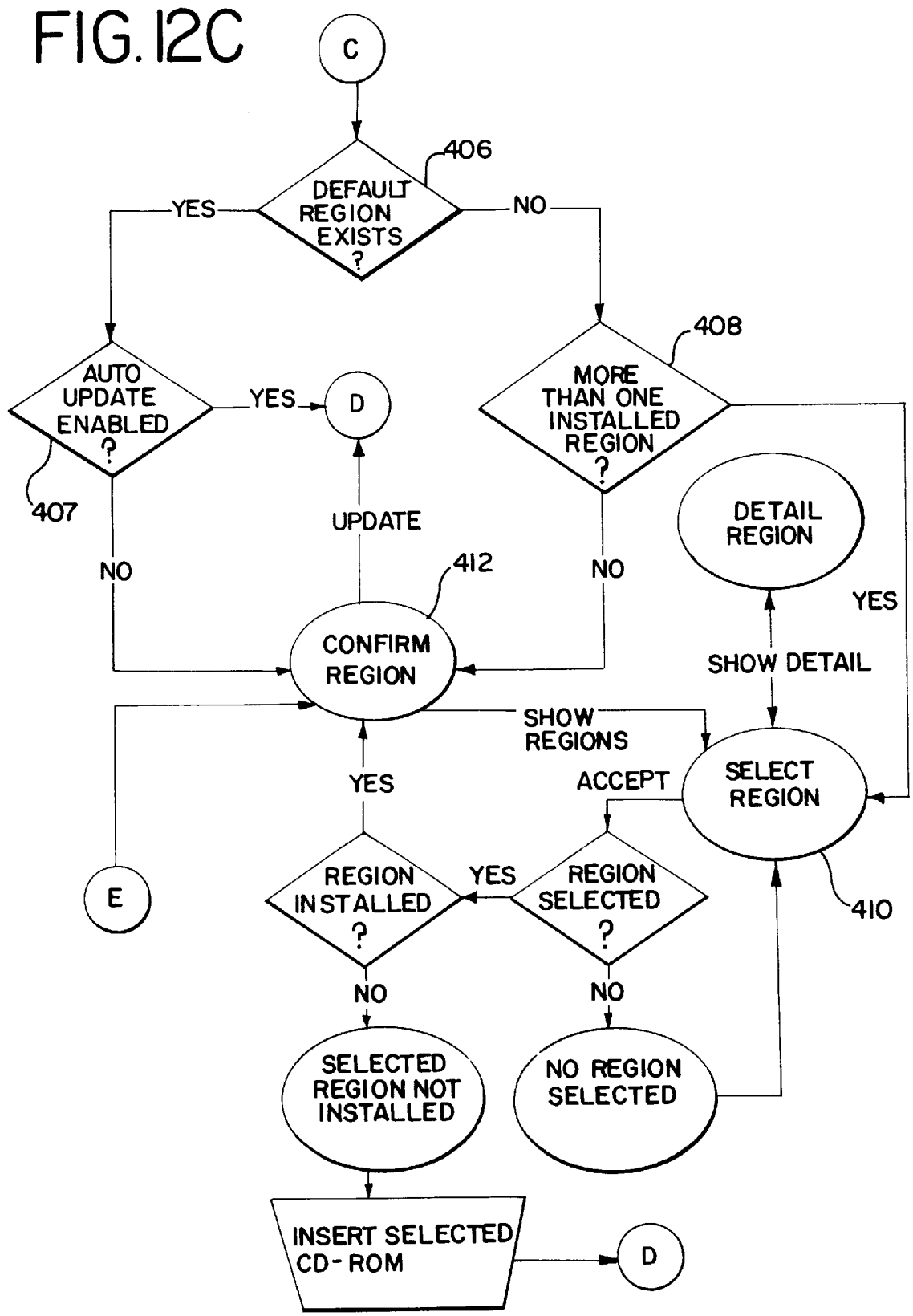
Figure 12D:
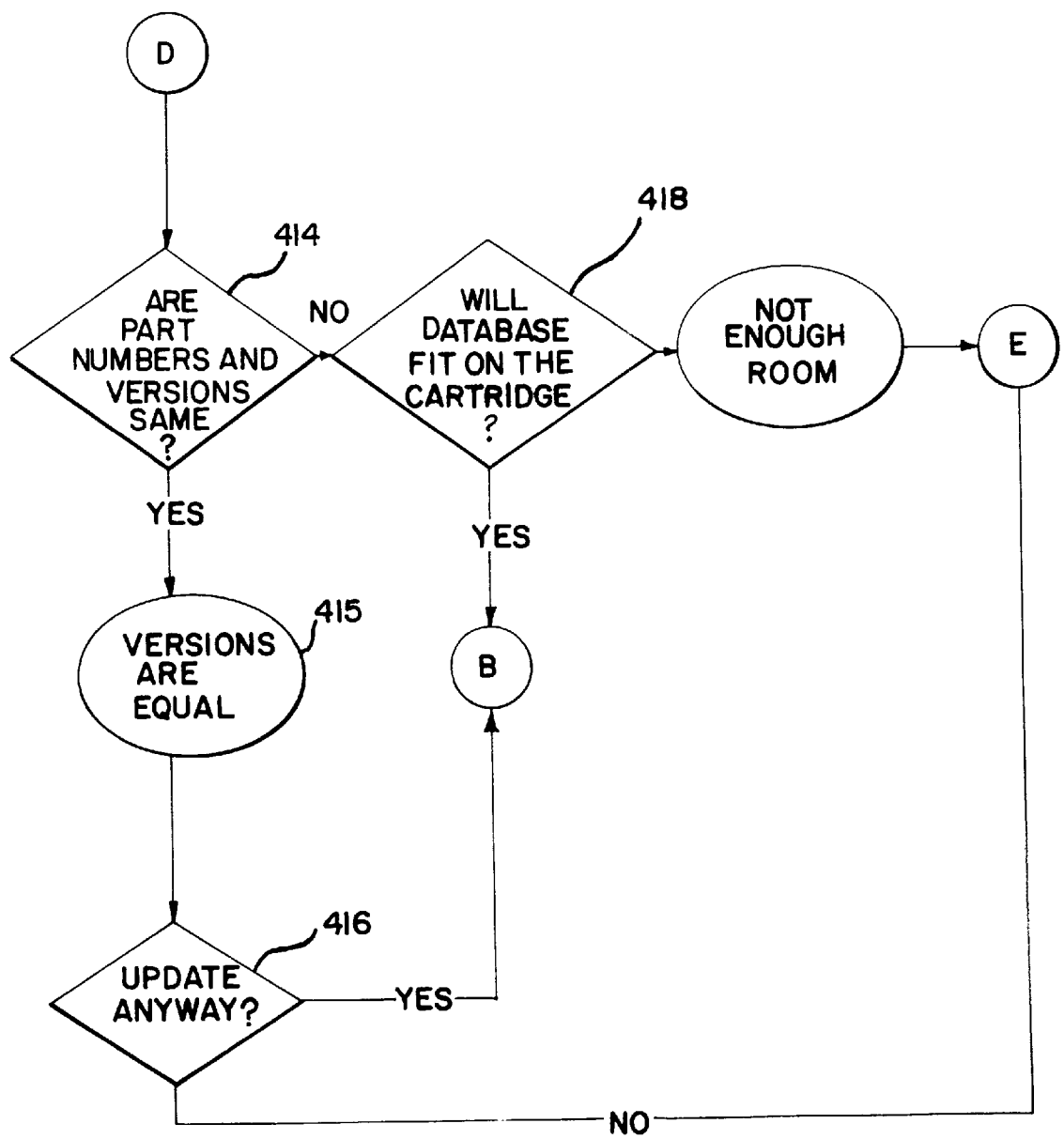
Figure 12E:
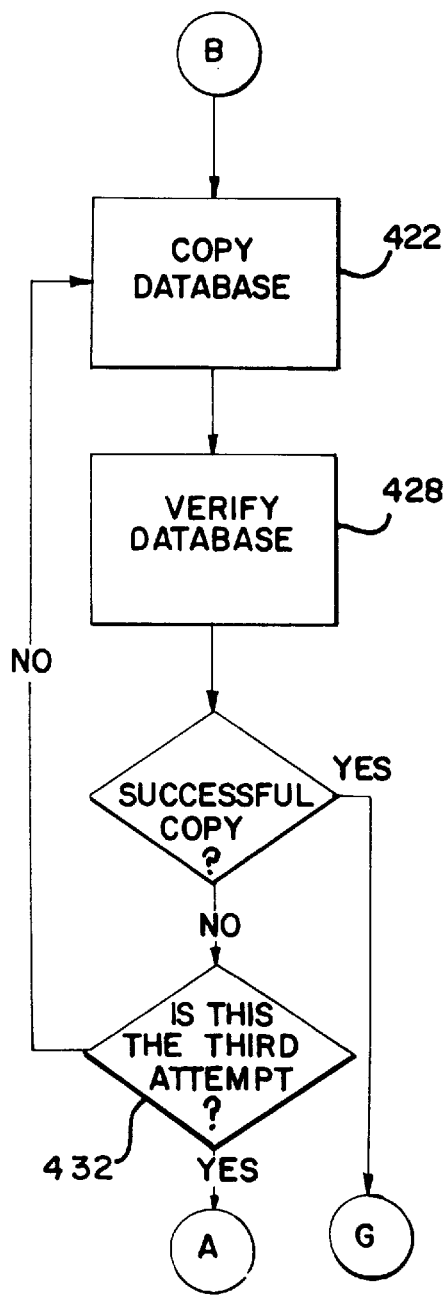
Figure 12F:
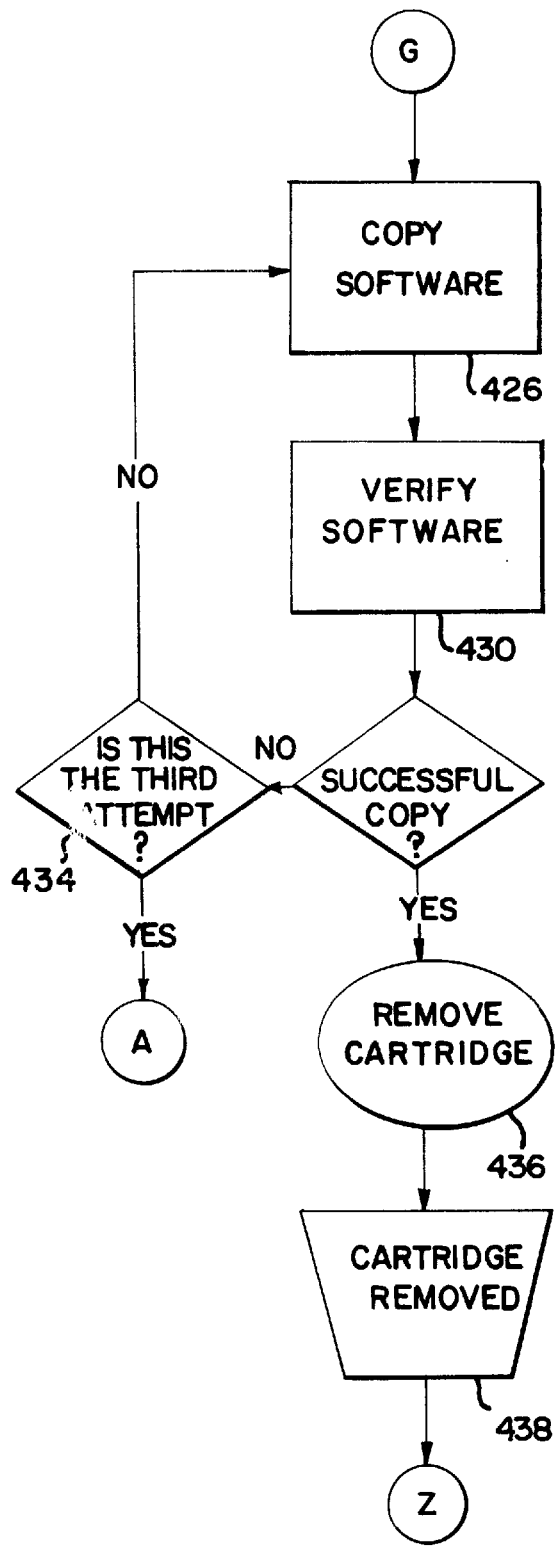
Figure 12G:
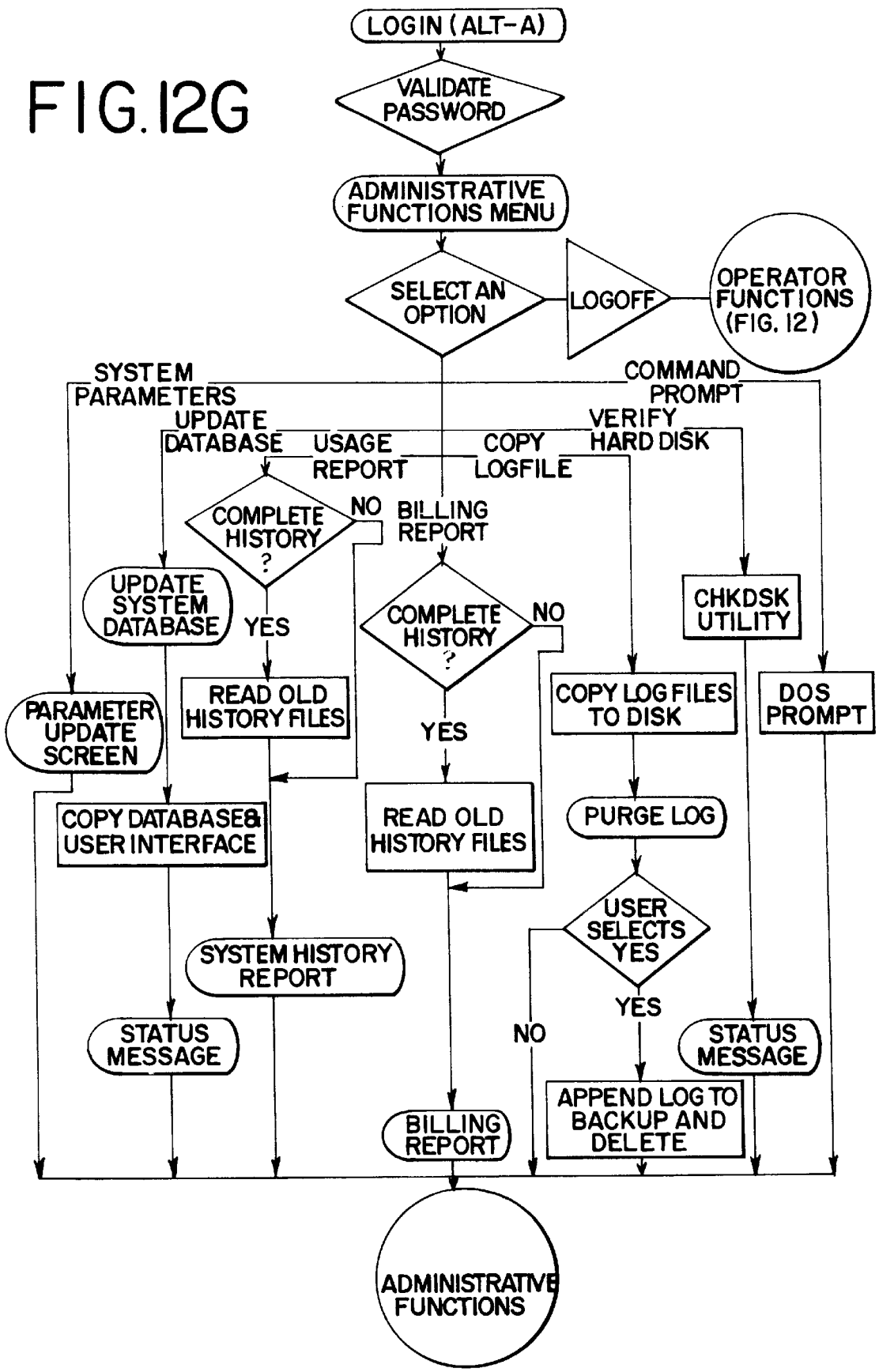
Figure 12H:
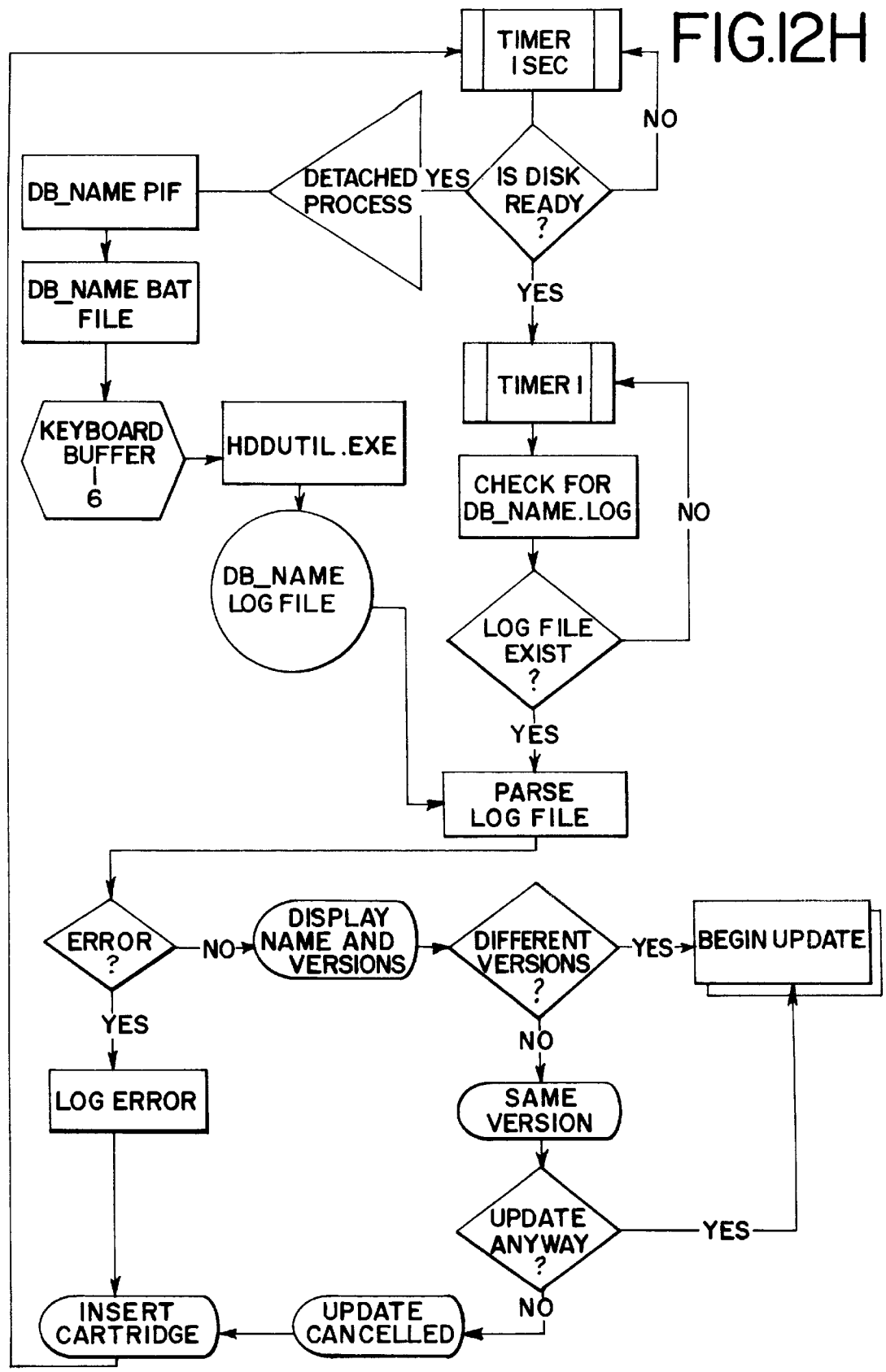

FIGS. 12A–12H are flow charts detailing the steps performed by the local repository program at a fleet operation. FIGS. 12A–12F show the portions of the local repository program normally used by the local operator for updating storage devices in fleet vehicles and FIGS. 12G and 12H show the administrative functions portion of the repository program for a fleet operation.

Referring to FIG. 12A, the local repository program for a fleet operation begins in a similar manner as the program for other-than-fleet operations. A screen on the local repository for a fleet operation displays a message to "Insert Cartridge" (FIG. 12A, Step 400) and waits for an action by the local operator (FIG. 12A, Step 401). The local repository detects the insertion of a cartridge into the slot of the repository and prompts the local operator to enter his ID (FIG. 12A, Step 402). Upon entry of a valid operator ID, the repository program reads the cartridge information (FIG. 12A, Step 404). If the local repository can read the cartridge information (FIG. 12A, Step 405), the program determines whether a "Default Region" has been established (FIG. 12C, Step 406) and if it has, whether an "Auto Update" has been enabled (FIG. 12C, Step 407). The "Default Region" and "Auto Update" options facilitate prompt updating of cartridges by by-passing several screens and selection opportunities.

If there is no "Default Region", the local repository program determines whether more than one region has been installed (FIG. 12C, Step 408), and if it has, prompts the operator to select regions (FIG. 12C, Step 410). The program displays a screen that prompts the operator to confirm the selections (FIG. 12C, Step 412). After confirmation, the program compares the part numbers and versions (FIG. 12D, Step 414). If the versions are the same, the operator is so informed (FIG. 12D, Step 415), but given an opportunity to perform the update anyway, even though the update should not be necessary (FIG. 12D, Step 416).

If the versions of data on the cartridge are older than the versions on the repository, the program next checks to be sure that the cartridge has enough capacity to store the new versions (FIG. 12D, Step 418). If there is not enough capacity on the cartridge, the repository program directs the operator back to reselect regions to be included on the cartridge (FIG. 12C, Step 412). Alternatively, if there is sufficient capacity on the cartridge to store the selected regions, the repository program proceeds to copy the updated geographical data set (FIG. 12E, Step 422) and then the updated navigation application program, if available (FIG. 12F, Step 426), to the cartridge. Copying of both the geographical data set and the navigation application program is verified (FIG. 12E, Step 428, and FIG. 12F, Step 430). If the copying of either the data set or the navigation application is unsuccessful, the program tries again (FIG. 12E, Step 432 and FIG. 12F, Step 434). After the updated data set and navigation application program have been copied, the operator is prompted to remove the cartridge (FIG. 12F, Steps 436 and 438).

The local repository program for fleet operations may include several related programs, files, and/or tools. The local repository program for a fleet operation may be written in any suitable programming language, such as Visual Basic, C++, etc. The source code for one embodiment of the local repository program for a fleet operator is included in the Appendix A of the microfiche appendix of this specification.

Figure 12I:
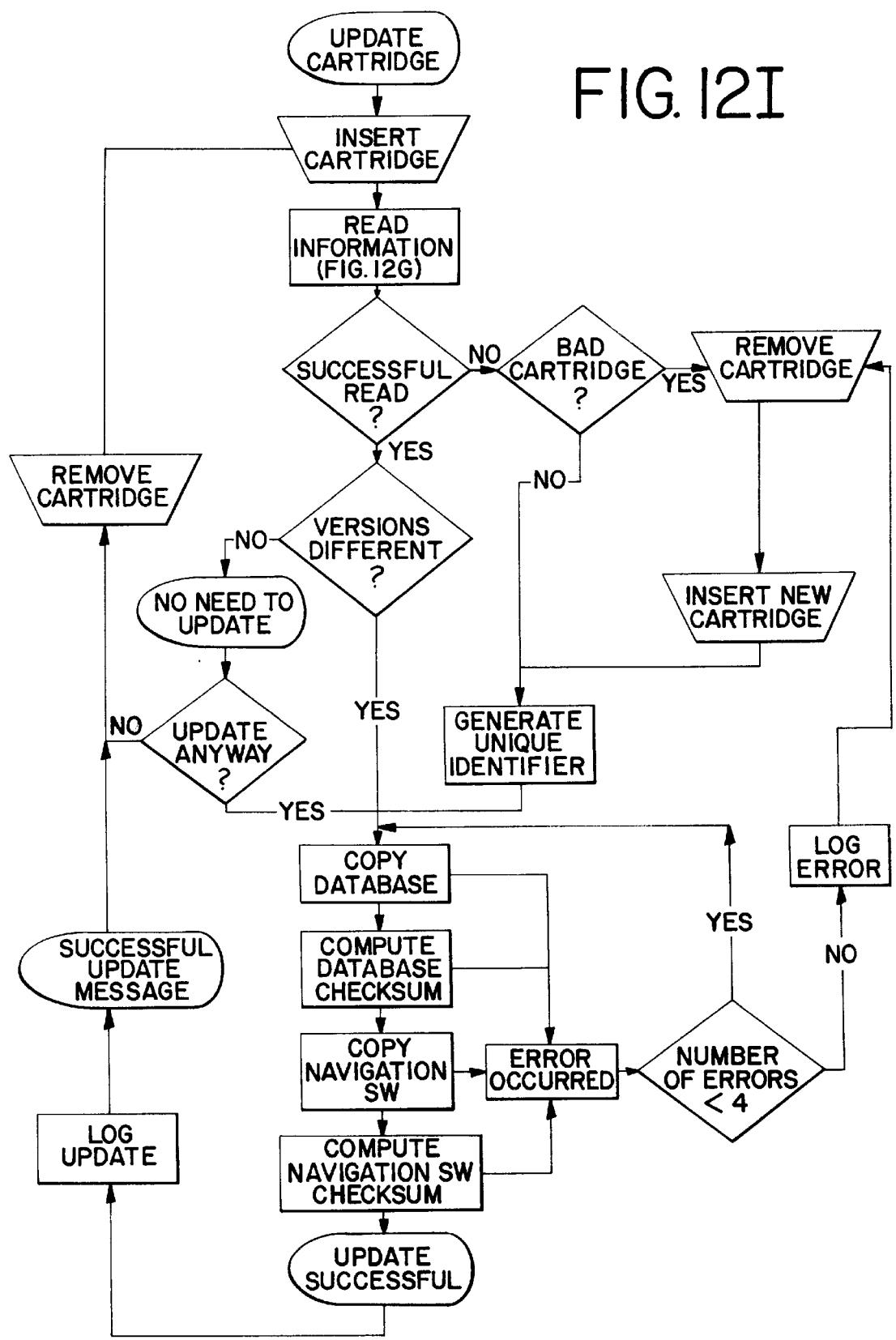

An alternative embodiment of the operator portion of the program for a local repository program for a fleet operator is represented in FIG. 12I. The embodiment of the program represented in FIG. 12I functions similarly to the portion of the program represented in FIGS. 12A–12F. The source code for the embodiment of FIG. 12I is included in Appendix B of the microfiche appendix of this specification.

D. Further operations performed with the local repository system

As mentioned above, the local repository system efficiently provides for the distribution of updated geographical data sets and navigation application programs to vehicle owners who have in-vehicle navigation systems, and in a preferred embodiment, vehicle owners may purchase subscriptions or licenses that entitle them to upgrade their navigation systems at any of the local repositories. The local repository system may be used for other purposes as well. These other purposes enhance the utility of the local repository system.

1. Initial distribution

Although a primary and ongoing use of the local repository system is to update existing rewritable media, the local repositories can also be used to initially place geographical data set files and navigation application programs on rewritable media. As mentioned above, each of the local repositories 82, 84, 86, 88, and 90 in FIG. 1 includes copies of at least one current geographical data set file for a geographical area, and additionally may include at least one navigation application program for an in-vehicle navigation system. Upon initially obtaining an in-vehicle navigation system, with the purchase of a new car from a dealer, from an after-market supplier, by mail order, or other means, a vehicle owner may receive a blank storage device for his navigation system. Alternatively, the vehicle owner may obtain a blank storage device at the local repository location. Either way, when the vehicle owner visits a local repository location, he requests the local operator to initially store the geographical data set and navigation application program on the blank storage device.

The local operator inserts the blank storage device into the drive of the local repository. As in the updating embodiment described above, prior to storing any geographical data set or navigation application program on the new media, the local repository program performs a validation procedure. The local repository program requests the local operator to enter a valid operator ID. After entering a valid operator ID, the local repository program attempts to read the storage device. Even if the storage device is new, the local repository program 100 may be able to read some information from the blank storage device, such as the cartridge ID and/or serial number. However, since the storage device is otherwise empty, the local repository program detects that this is a new storage device (FIG. 8C, Step 361) and request that appropriate information be entered to register the vehicle owner with a new subscription. The vehicle owner may make appropriate arrangements to obtain a subscription from the local operator if he has not already obtained a subscription with the initial purchase of the navigation system. For a new subscription, the local repository may request information such as navigation system type, warranty start date, subscription terms, the vehicle owner's name, address, telephone number, etc. This information may be used in tracking subscriptions. As in the update embodiment, an input screen may be provided that allows the local operator to enter each of the required items of information. Some fields of information may be required while others may be optional. The operator enters information for at least the required fields in order to proceed with copying the geographical data set and navigation application program onto the storage device for the navigation system. Unless the appropriate data is entered and written onto the storage device, the local repository program does not proceed to copy any of the geographical data set or navigation application program.

The local operator or the vehicle owner may choose to install a geographical data set covering several geographical areas and/or supplemental data. If the vehicle owner desires a geographical area that is not on the local repository, then the vehicle owner may have to obtain the geographical data set from another source. A customer service desk has access to a list of local repositories in the vehicle owner's area and can direct the vehicle owner to a location that has the desired coverage area (e.g. a travelers' service office).

If the geographical data set and navigation application program selected by the vehicle owner are available, they are loaded onto the storage device. The local repository then verifies that the navigation program and geographical data files have been correctly loaded onto the storage device. The verification may involve checking the file names, versions, and performing a checksum. The storage device is now ready for use by the vehicle owner and the local operator installs it in the vehicle owner's navigation system. The vehicle owner or local operator may contact a help desk at a central facility if any problems are encountered.

2. Failed or defective media procedures

In a preferred embodiment, the main program 100 on the local repository may also be used to implement error handling procedures for both defective storage devices and operator errors. Errors that should be trapped include: failed storage devices, ejecting a storage device during an update, geographical data set file or navigation application program validation failure, and other run-time errors. All error messages may provide clear instructions to the operator regarding what actions he needs to take. The local repository may also include error codes in the error messages that can be used by customer service to debug the error and assist the operator.

If the storage device, such as the PCMCIA card, is defective, the local operator may replace it with a new storage device from stock. There are several ways that the local repository can handle defective storage devices, depending on the severity of the detected error.

In some cases, the local repository will be able to read the storage device identification data 110 but will not be able to copy the geographical data set file or navigation application program to the storage device. This can occur if the storage device contains a defective hard drive with bad sectors. In a preferred embodiment, the cartridge ID is stored on a re-writable EPROM of the storage device. Therefore, the ID may still be readable since it is stored in a non-volatile memory in the PCMCIA storage device rather than on the hard disk portion of the PCMCIA card. This writable EPROM memory may also be used to store the warranty end date, subscription type and end date, navigation system type, and other identifying information 110. If the local repository program can read the identification data from the EPROM, but encounters problems reading or writing to the hard disk of the storage device, the local repository program 100 displays a message indicating that the storage device is bad and asking the operator if he wants to replace it with a new storage device. If the operator responds affirmatively, the local repository is set to "Cartridge Replacement Mode." The local repository program retains the identification information from the defective storage device in memory. The local repository program then instructs the operator to remove the bad storage device (FIG. 8G, Step 371) and insert a new storage device.

When a new storage device is inserted, the local repository attempts to read the storage device identification information. Since the storage device is new, no identification information exists on the device. However, since the local repository is in "Cartridge Replacement Mode" (FIG. 8B, Step 375), the identification information from the old storage device is copied from memory to the new storage device. The update then proceeds as normal and the local repository is taken out of Cartridge Replacement Mode.

When the local repository program is in Cartridge Replacement Mode, and information is detected on the substitute storage device inserted into the local repository, the local repository assumes the operator did not insert a new storage device. A message is displayed to notify the operator that the storage device is not new and, therefore, should not be used to replace the bad storage device (FIG. 8B, Step 379). The operator is given the choice to continue the update or cancel. If the operator decides to continue, the local repository is taken out of Cartridge Replacement Mode, the information already existing on the inserted PC Card is retained, and the update proceeds as normal (FIG. 8B, Step 381).

If the storage device that the vehicle owner brings in for updating is so defective that no identification data can be read from it, the local repository instructs the operator to replace the defective storage device with a new one. The local repository reads the new storage device when the operator inserts it into the drive. Since the storage device is new, it does not contain any customer information. The local repository handles this scenario the same way it does with any new storage device: the local operator obtains the required information from the vehicle owner and enter the information into the system. The cartridge ID will be the same as the serial number printed on the label of the storage device. The old and new storage device IDs are written to the history log so a link can be established between the bad storage device and its replacement in order to track the warranty. The operator may call a customer service desk to obtain the customer ID and subscription information and enter it into the local repository which then re-writes it back to the new storage device. The local repository then copies the requested geographical data set file and other appropriate software to the storage device.

A similar procedure for handling defective media is set forth in the embodiment represented in the flow chart of FIG. 12B.

3. Demonstration mode

The local repository system may be used to make demonstration mode storage devices. The demonstration mode storage device is used in the same types of navigation systems as described above, but are provided so that potential customers can try out the navigation system before purchasing one. Special demonstration licenses would be provided for this purpose. When a storage device used for a demonstration navigation system is inserted into a local repository for updating, the main program on the local repository detects that the storage device was made for a demonstration navigation system and updates it accordingly.

The demo mode storage device may be made at local repositories at automobile dealerships or other locations where navigation systems are sold. The same local repository program used for updating existing storage devices may be used to make demonstration storage devices (FIG. 8C, Steps 391 and 393). The demo mode storage device would not have identification data to specify a vehicle owner since the navigation system has not yet been sold to an end user.

When a car is sold with a demo storage device, the dealer may convert the storage device. The local repository program permits conversion of the demo storage device to a storage device subject to a customer subscription (FIG. 8C, Step 394). Appropriate information to identify the vehicle owner is requested from the vehicle owner in a manner similar to when a new subscription is sold (FIG. 8D, Step 313).

4. Administrative functions at local repositories

As mentioned above, the local repository includes the administrative program 130. The administrative program 130 includes several features that can be used to maintain the local repository. The source code for one embodiment of the administrative functions program is included in Appendix A of the microfiche appendix of this specification. Flow charts for the administrative functions portions of embodiments of the local repository programs are represented in FIGS. 8H–8L and FIGS. 12G and 12H. The administrative functions program 130 is accessible by an administrator-technician, but normally not by the local operator. A password may be required to access the administrative functions program.

One of the functions performed by the administrative program is the installation of updated geographical data sets and navigation application programs onto the local repository, as explained above.

Figure 8I:
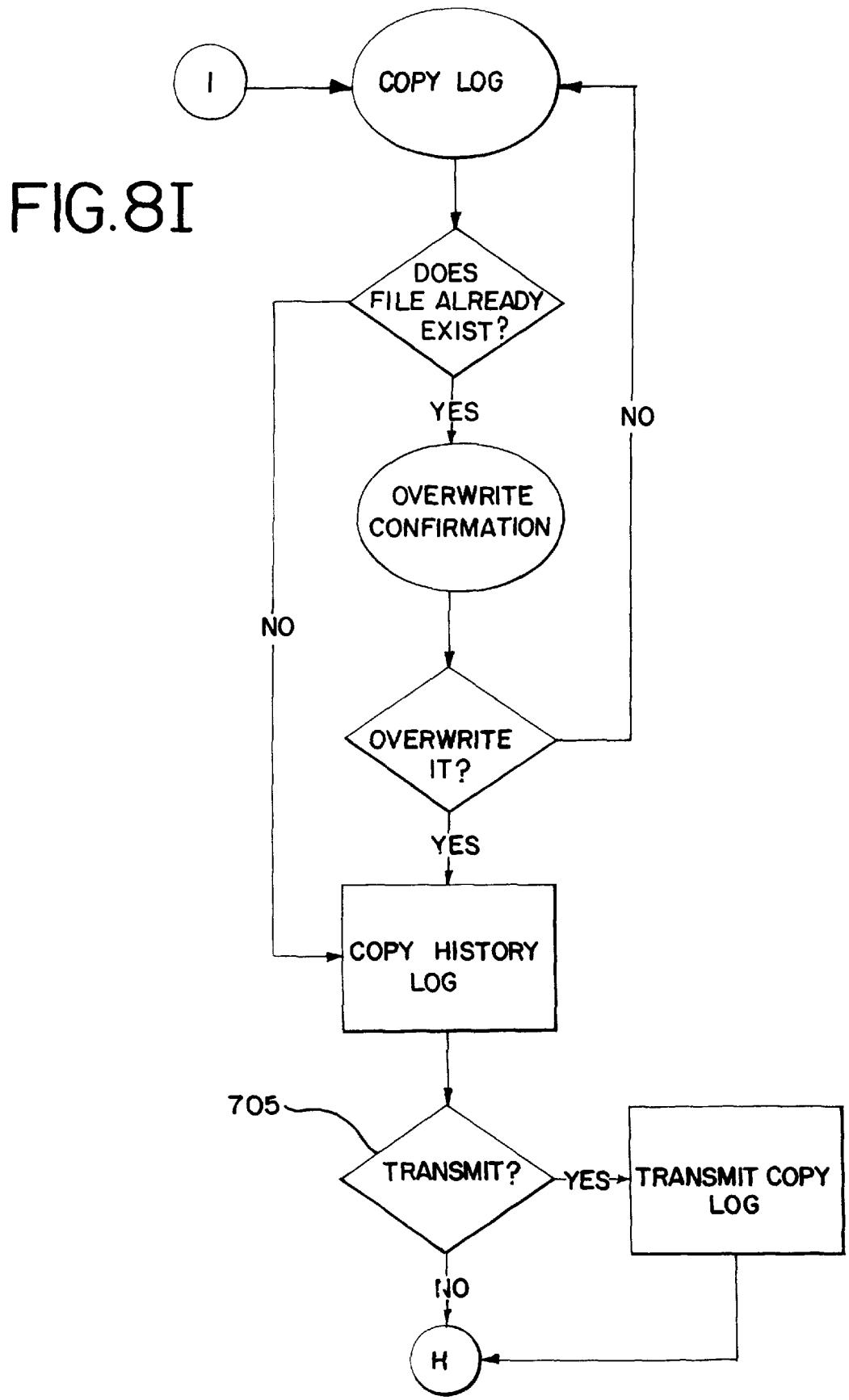
Figure 8J:
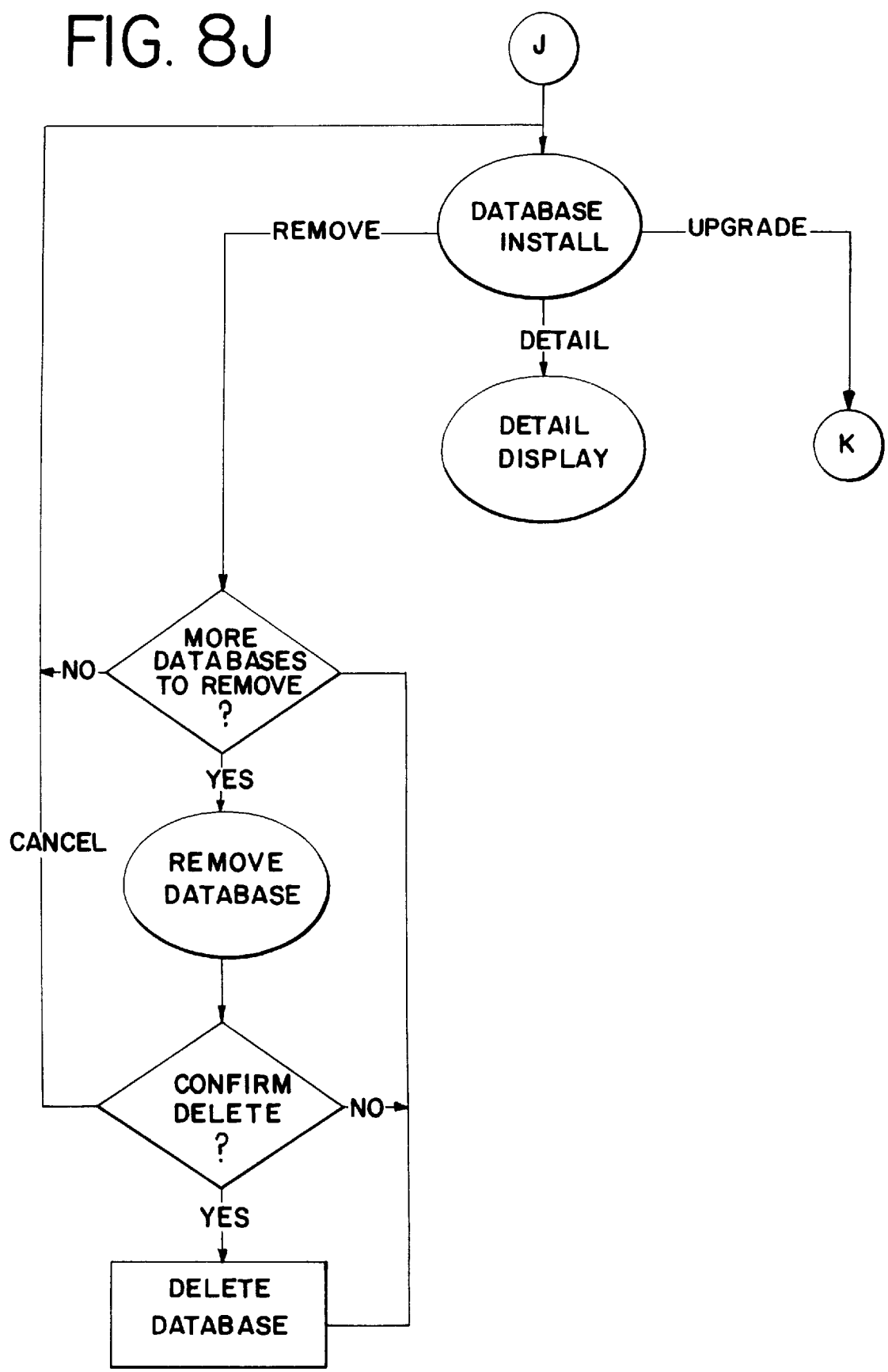
Figure 8K:
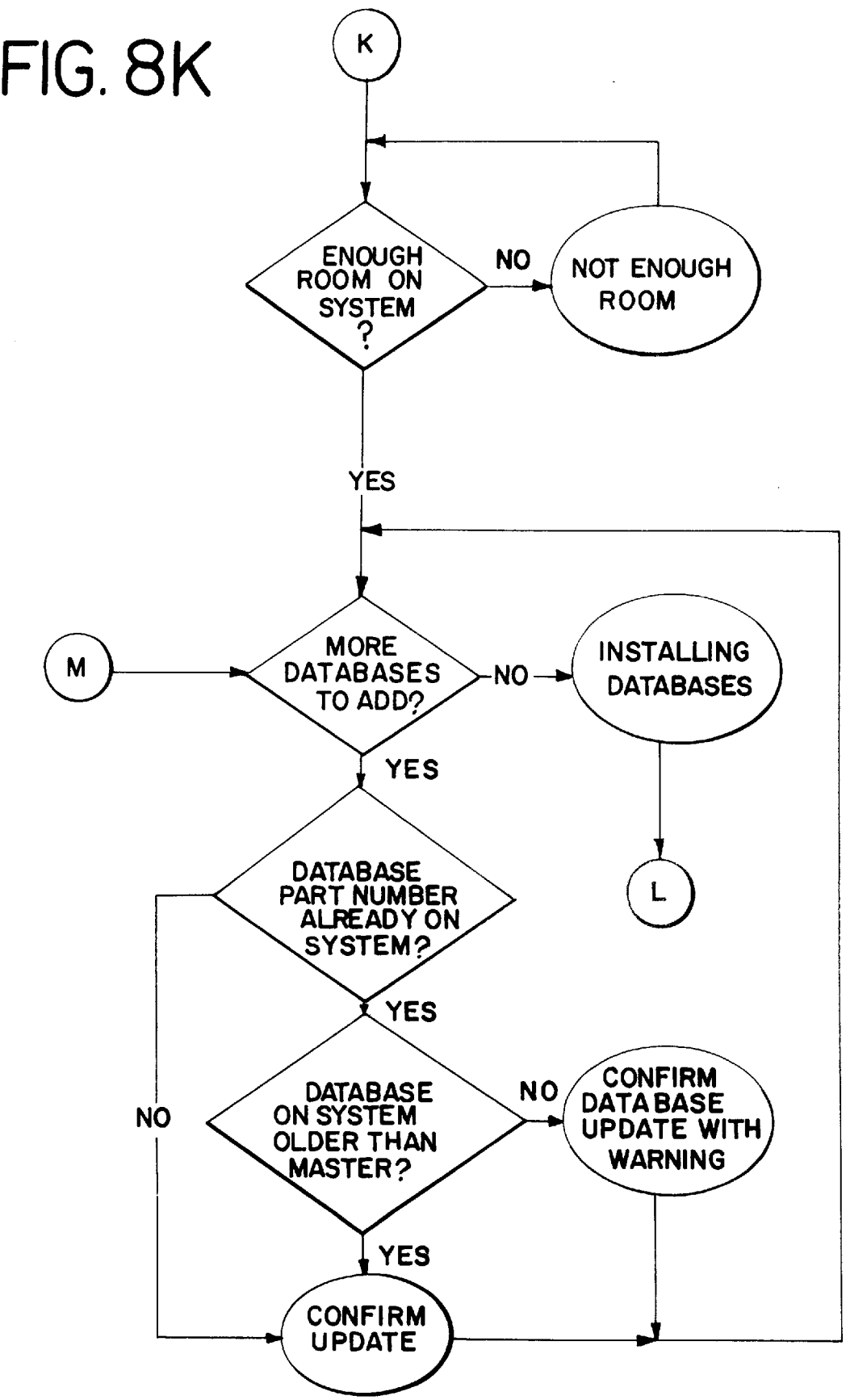
Figure 8L:
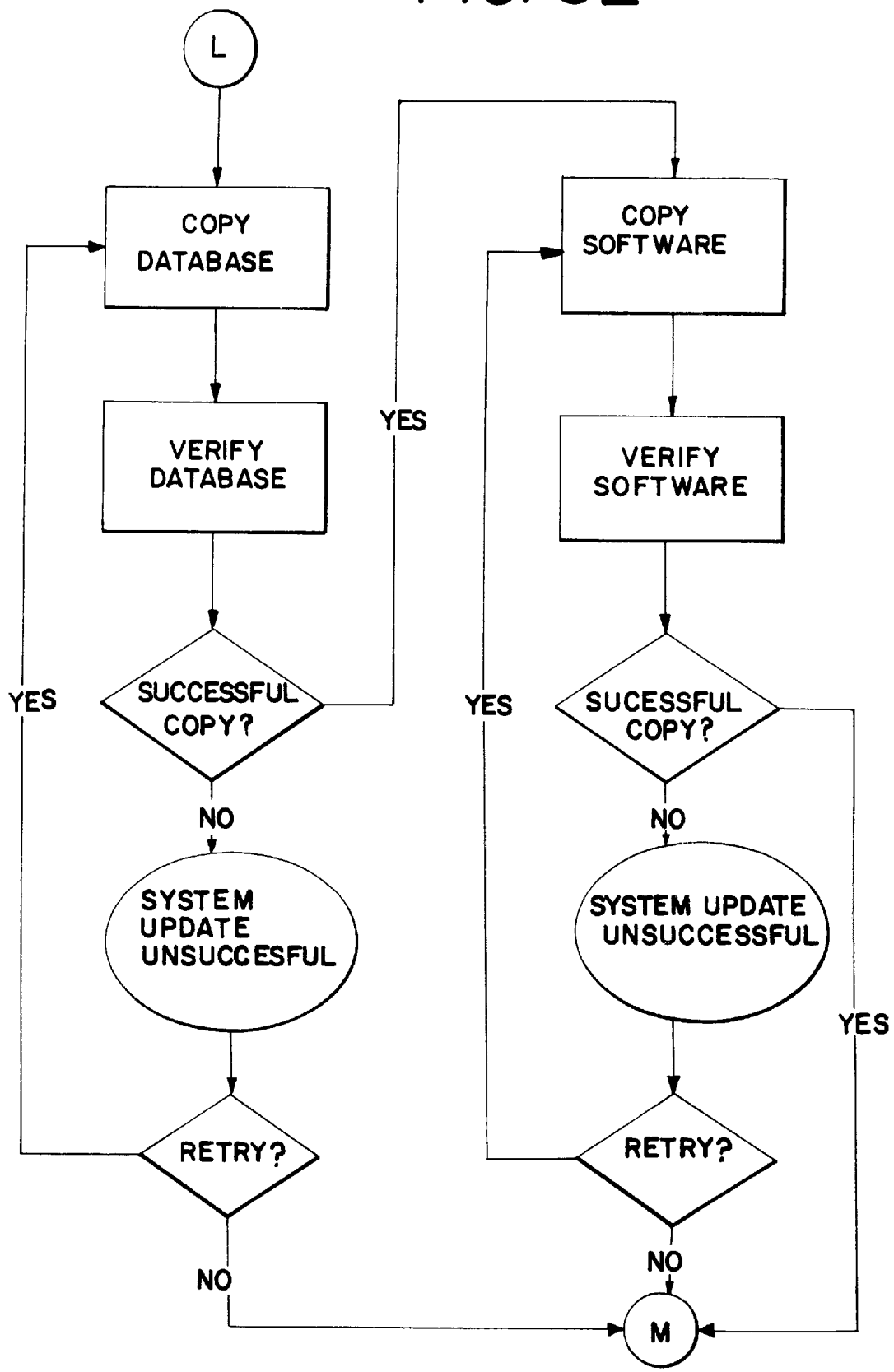

Another of the functions performed by the administrative program is the transmission back to the central facility of a history log (FIG. 7, Step 239; FIG. 8I, Step 705). The history log includes user and activity records associated with the local repository, such as vehicle owner name and address, media ID's updated, dates and times of updates, coverage areas copied, subscriptions sold, etc. Each local repository may have a repository ID that uniquely identifies the local repository by location and type. At regular intervals or on-demand, each local repository transmits all usage and customer information back to the central facility. Alternatively, an administrator-technician may retrieve this information locally if a phone line and modem are not available.

IV. Alternative embodiments

A. Electronic distribution to local repositories

Figure 13A:
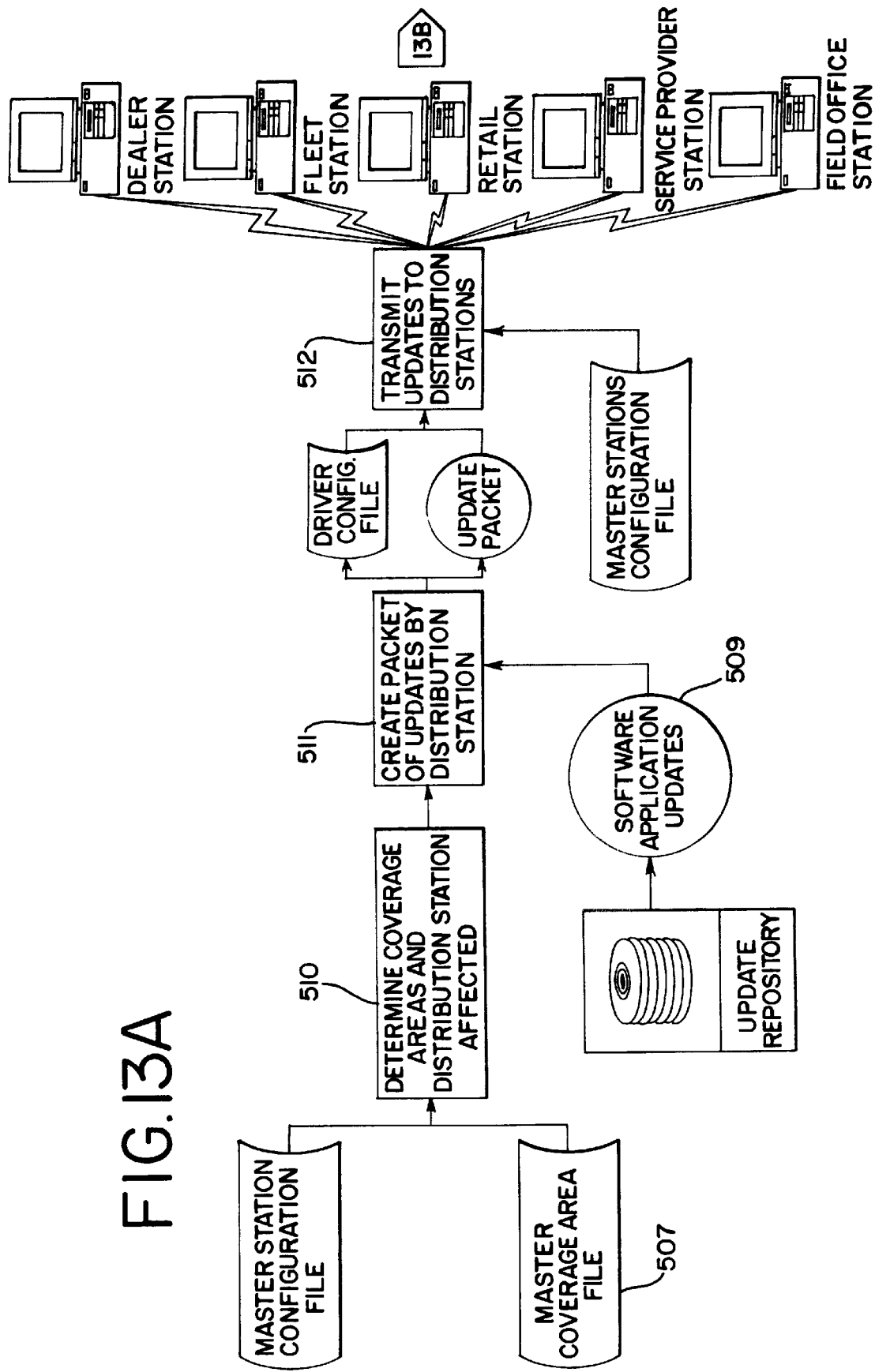
FIGS. 13A and 13B are flow charts for an alternative embodiment of the present invention.
Figure 13B:
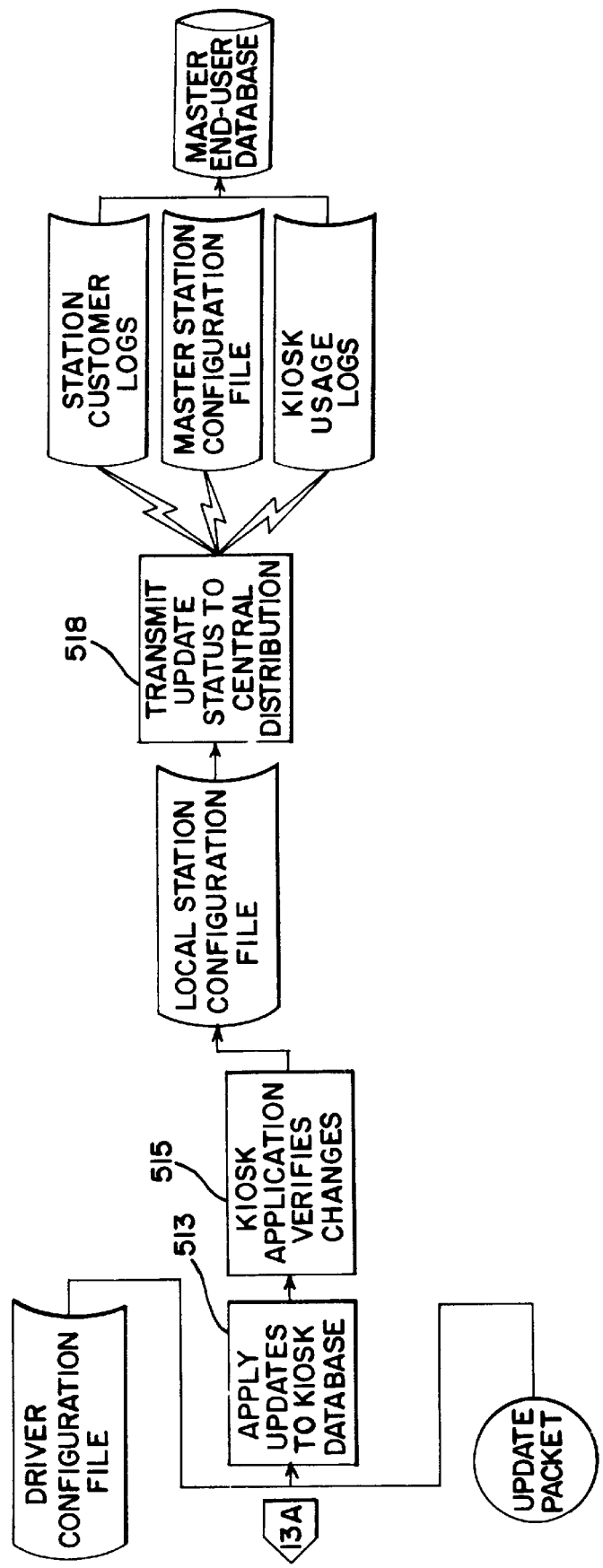

In an alternative embodiment shown in FIGS. 13A and 13B, installation of updated geographical data sets and navigation application programs onto the plurality of local repositories in a geographical area may be done electronically from a central or regional location that uploads the updated geographical data sets and navigation applications onto each local repository. As mentioned above, each of the local repositories has a communication link with a central or regional facility. This communication link may be by modem or WAN. According to this alternative embodiment, updated geographical data sets 507 for a geographical area and updated navigation application programs 509 are transmitted by a communication feed from the central or regional facility. These feeds may be made on a regular basis or as needed. A determination is made at the central facility as to which local repositories should get copies of the new geographical data sets and navigation application programs (FIG. 13A, Step 510). Then, blocks of the updated geographical data sets and navigation application programs are prepared (FIG. 13A, Step 511). The updates are then sent out electronically to all of the local repositories that the central facility determines should receive them (FIG. 13A, Step 512). The updates may be sent in compressed form. When the updates are received at each local repository, the programming on the local repository performs any necessary de-compression and replaces the old versions of geographical data set files and navigation application programs with the updated versions (FIG. 13B, Step 513). The process of applying updates preferably runs in the background on the local repository so that the local repository would still be available to a vehicle owner to use to obtain an update.

The administrative functions program at the local repository verifies that all the appropriate updates of the geographical data set files and navigation application programs have been received (FIG. 13B, Step 515). Confirmation that the updates have been successfully applied is transmitted back to the central facility (FIG. 13B, Step 518). Thereafter, the updated geographical data sets and navigation application programs are made available to the vehicle owners who wish to update their geographical data set files and/or navigation application programs. Until successful confirmation, the old geographical data set files and navigation application programs on the local repository would still be available to vehicle owners.

B. Electronic distribution to vehicle owners

Figure 14B:
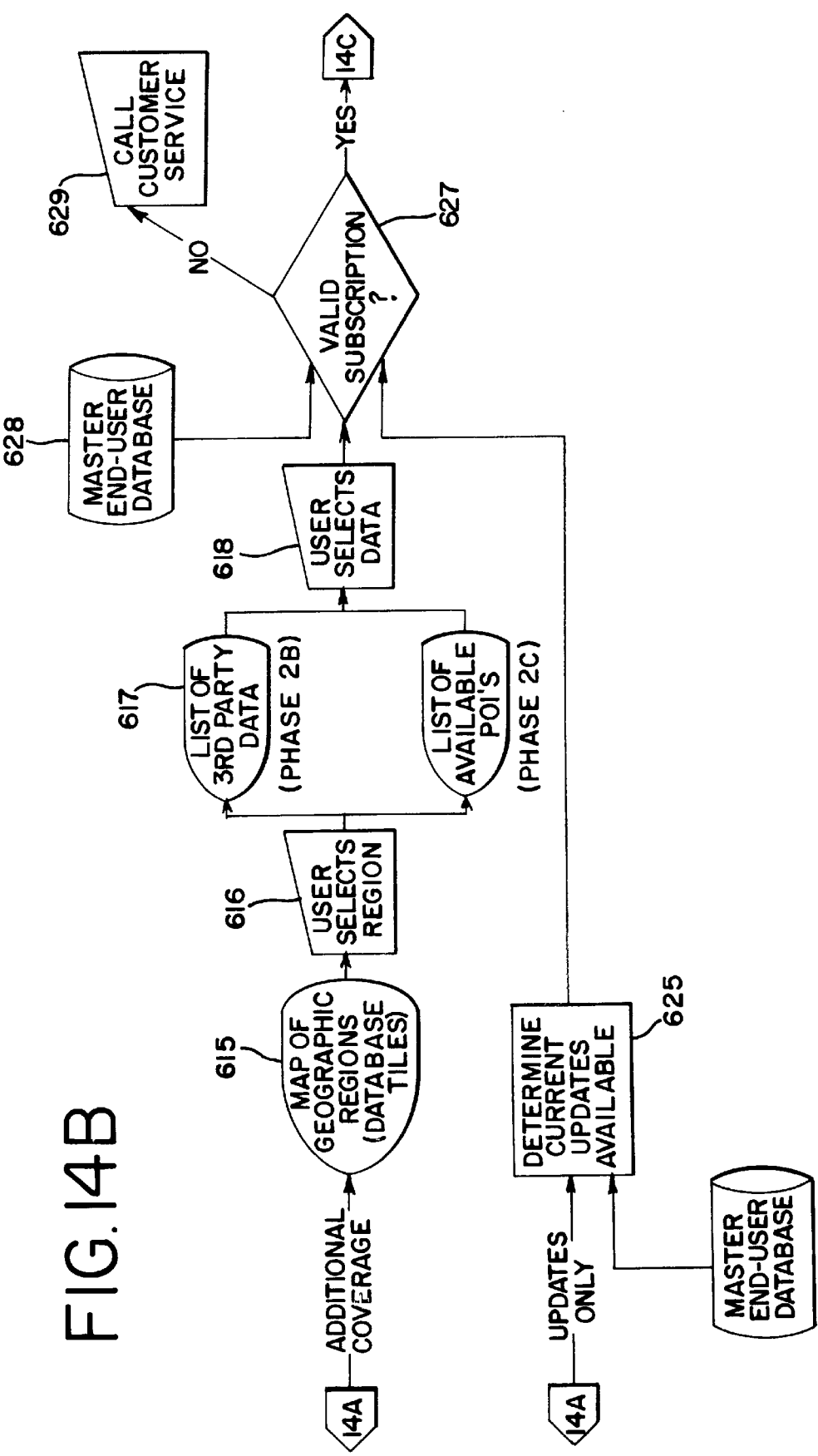
Figure 14C:
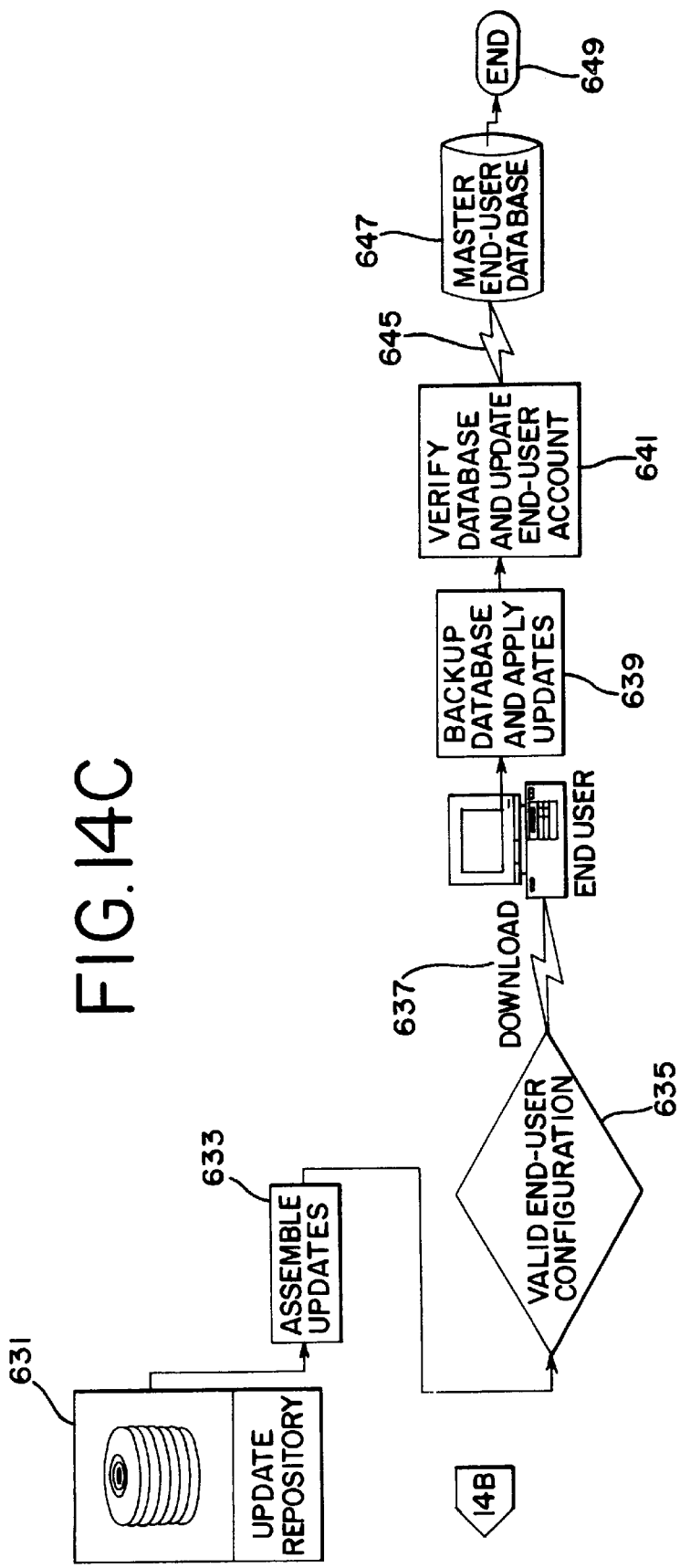

According to another alternative embodiment, updated geographical data sets and navigation application programs may be transmitted directly to owners of vehicles with in-vehicle navigation systems via on-line distribution. Referring to FIGS. 14A–14C, vehicle owners may receive updates for their geographical data sets via their own personal computers. Subscribers to geographical data sets receive a personal updating program that handles all routines (e.g. communications, confirmation). The personal updating program also verifies the vehicle owner's personal computer's hardware configuration to ensure it meets minimum standards. For example, the personal computer should have a drive or slot that is compatible with the storage device from the in-vehicle navigation system. Any hardware deficiencies are identified and the user is informed about what he will need.

Using the personal updating program, the vehicle owner dials up the central distribution facility or a service provider from his personal computer (FIG. 14, Step 611). An on-line distribution program on a server at the central facility acknowledges the vehicle owner and completes the connection. The on-line distribution program prompts the vehicle owner to enter an identification number such as his customer number (FIG. 14A, Step 612). If the vehicle owner enters a valid customer number, the on-line distribution program prompts the vehicle owner to insert his storage device from his navigation system into a slot on his computer. The on-line distribution program then reads the media ID and verify that it corresponds to this customer. The on-line distribution program then prompts the vehicle owner to select between updating an existing coverage area or adding additional coverage areas (FIG. 14A, Step 613).

If the user wants additional coverage areas, the on-line distribution program displays a map of geographic regions available (FIG. 14B, Step 615). The vehicle owner then selects the desired regions from the screen (FIG. 14B, Step 616). The on-line distribution program prompts the user to select any third-party data or POI's (points of interest) to be included in the coverage area (FIG. 14B, Step 617). The user selects the desired third party data or POI's (FIG. 142, Step 618).

If the user does not want any additional coverage (Step 617), but instead wants to update only his existing geographical data set file or navigation program, the on-line distribution program determines whether there are any updates available for the geographical data set or navigation program of the user (FIG. 14B, Step 625). Records of the coverage area(s) previously chosen by the vehicle owner are kept both on the vehicle owner's storage media and at the central distribution facility 628. The on-line distribution program performs a reconciliation process to identify the updates that are available for the vehicle owner's media.

The on-line distribution program compares the vehicle owner's selections to his current subscription status (FIG. 14B, Step 627). If the on-line distribution program determines that the updates are not covered by a current subscription, the user is prompted to call a customer service number that offers a subscription to the user (FIG. 14B, Step 629), or alternatively, the user is prompted by the on-line distribution program with an offer to purchase a subscription plan while on-line.

In FIG. 14C, if updates are available, the on-line distribution program retrieves the updates required for the vehicle owner's coverage area and for the user's navigation program from update repositories 631. The on-line distribution program may then assemble the updated navigation data for transmission to the user's computer (FIG. 14C, Step 633). If the user has selected new navigation data, the on-line distribution program application may compare the available communication bandwidth with the size of the navigation data file to provide the user with an estimate of the time that would be required to download the new navigation data file (FIG. 14C, Step 635). If the downloading time is excessive, the user may choose not to download the new geographical data set file, and the on-line distribution program may prompt the user to go to an appropriate other local repository or other distribution station to obtain the new navigation data file.

If the vehicle owner's hardware is sufficient to receive the updated navigation data file, the on-line distribution program uploads the updates to the user's personal computer (FIG. 14C, Step 637). On the vehicle owner's personal computer, the personal updating program receives the update, makes a backup of the user's navigation data files, and copies the updated navigation data files to the vehicle owner's storage device (FIG. 14C, Step 639). The personal updating program verifies the navigation data files to insure that they are properly functioning on the storage device for the vehicle owner, and in addition, identification data is written to the vehicle owner's storage device to indicate that the navigation data was updated (FIG. 14C, Step 641). If the updating process is successfully completed, before the communication connection is ended, the vehicle owner's program up-loads information to the on-line distribution program at the central facility to confirm the successful updating of the vehicle owner's storage device (FIG. 14C, Step 645). The central facility maintains a record of the confirmation (FIG. 14C, Step 647). Then the communication connection between the vehicle owner's personal computer and the central facility's server is ended (FIG. 14C, Step 649).

In an alternative embodiment, the on-line distribution of updated information may be provided through an on-line network, such as America Online or Compuserve, or via the Internet.

C. Local terminal embodiment

Referring to FIG. 15, there is depicted a flow chart for another embodiment of the system for distributing updated navigation data to owners of navigation systems. The steps set forth in FIG. 15 may be used with a system of personal computers located in a geographical area. The system of personal computers may be similar to the system shown in FIG. 1. According to this alternative embodiment, some or all of the local repositories 82, 84, 86, 88, and 90 in the geographical area 10 would be replaced with local terminal stations. The local terminal stations would have similar hardware and software as the local repositories in the embodiment of FIG. 1, and would be configured similarly. Like the local repositories, the local terminal stations would include a drive or slot into which a vehicle owner's storage device 76 can be received. The local terminal stations differ from local repositories in that the local terminal stations would include a communication link to a central or regional facility that would be sufficient to distribute and write updated navigation data from a remote repository to a vehicle owner's storage device inserted in the drive 92 in the local terminal station.

Referring to FIG. 15, a local terminal program on the local terminal station prompts the local operator to insert the vehicle owner's storage device (FIG. 15, Step 701). Upon insertion of the vehicle owner's storage device, the local terminal program validates the vehicle owner's storage device (FIG. 15, Step 703). This portion of the local terminal program may be similar or identical to the program used on the local repository, and may include validation of the vehicle owner's identification data 110 stored on an EPROM on the storage device. After validation, the local terminal program confirms a communication connection to a remote repository 707 (FIG. 15, Step 705). The remote repository 707 may be a regional repository, a central repository, or even another local repository. The communication connection may be a WAN, a telephone modem connection, etc.

The local terminal program presents the local operator or vehicle owner with an opportunity to select updating existing navigation data or installing new navigation data (FIG. 15, Step 709). The vehicle owner's selections are accepted (FIG. 15, Step 711) and transmitted to the remote repository 707 (FIG. 15, Step 713). The remote repository retrieves the selected updated navigation data and transmits them to the local terminal station (FIG. 15, Step 715). The local terminal station receives the navigation data and copies them to the user's storage device (FIG. 15, Step 717). After the updated navigation data are copied to the vehicle owner's storage device, the local terminal station prompts the local operator to remove the user's storage device (FIG. 15, Step 719). In addition to the steps specifically mentioned, the local terminal station may perform many of the steps performed by the local repository, such as validating the copying of the navigation data, error checking, logging, etc.

An advantage provided by this embodiment of local terminal stations is that copies of some or all of the updated navigation data need not be stored on the local terminal station. In an alternative embodiment, the features of a local repository and a local terminal station may be combined so that a vehicle owner may update his storage device at a local terminal-repository with navigation data that is either stored locally on the local terminal-repository or that is transmitted from a remote repository to the local terminal-repository and copied onto the storage device locally.

D. Further alternative uses of distribution system

The embodiments of the system described above are particularly useful for distributing updated geographical data sets for in-vehicle navigation systems used in automobiles. However, the system could also be used to update other types of software or data, including software for personal computers, computer game storage devices, etc. Distribution of updated geographical data may also be used in application programs used for fleet distribution and marketing. Further, although the systems described above are described as being useful for land-based vehicles, they could be used in other-than-land-based vehicles as well, such as boats and aircraft.

Embodiments of the present system may also be used to update navigation systems that do not include a positioning system, as well as other systems that incorporate geographical data sets. For example, systems are available that permit a user to select a destination and a starting point and then give the user directions to get to the destination from the starting point. These types of navigation systems are available on portable dedicated computers or as software programs that can be loaded on conventional personal computers, such as portable notebook computers, or on hand-held computers or personal digital assistants (PDA's). Such systems may be updated with embodiments of the systems, as described above.

It is intended that the foregoing detailed description be regarded as illustrative rather than limiting and that it is understood that the following claims including all equivalents are intended to define the scope of the invention.

We claim:

1. A system for updating navigation systems installed in vehicles comprising:

a plurality of local repositories accessible to owners of said vehicles and located in a geographical area, wherein each of said plurality of local repositories includes updated versions of navigation data for said navigation systems; and wherein each of said plurality of local repositories includes a program that determines entitlement to said updated versions of navigation data based on subscription information available to the local repositories and version information included in the navigation systems.

2. The system of claim 1 wherein said navigation data comprises geographical data sets.

3. The system of claim 1 wherein said navigation data comprises information about streets that said vehicles may travel.

4. The system of claim 1 wherein said navigation data comprises map information.

5. The system of claim 1 wherein said navigation data comprises updated versions of navigation application programs.

6. The system of claim 1 wherein said local repositories further comprise:

means for replacing defective storage devices from said navigation systems.

7. The system of claim 1 wherein said local repositories further comprise:

slots into which storage devices from said navigation systems can be received.

8. The system of claim 1 wherein said local repositories further comprise:

updating means for copying said updated versions of navigation data to storage devices in said navigation systems.

9. The system of claim 8 wherein said local repositories further comprise:

cabling for connecting said updating means to said storage devices.

10. The system of claim 1 wherein said local repositories comprise means for updating the versions of navigation data stored at said local repositories.

11. The system of claim 1 wherein said local repositories comprise personal computers.

12. The system of claim 1 wherein said navigation systems installed in vehicles include positioning systems.

13. The system of claim 1 wherein said plurality of local repositories further comprise:

means for storing initial copies of navigation data in navigation systems installed in vehicles.

14. An upgradable navigation system for use in a vehicle comprising:

a geographical data set on a storage medium; and a navigation application program that uses said geographical data set to provide navigation information to a vehicle driver, wherein said storage medium further includes data indicating whether said storage medium is entitled to be updated, whereby updated geographical data can be supplied from an external source based upon said data indicating whether said storage medium is entitled to be updated.

15. The navigation system of claim 14 further comprising:

a positioning system that provides an output to said navigation application program indicating a position of the vehicle.

16. The system of claim 14 wherein said storage medium is re-writable.

17. The system of claim 14 wherein said storage medium is a PCMCIA card.

18. The system of claim 14 wherein said storage medium is a removable hard disk.

19. The system of claim 14 wherein said storage medium is a non-removable hard disk.

20. The system of claim 14 wherein said storage medium is a writable CD.

21. The system of claim 14 wherein said data indicating whether said storage medium is entitled to be updated is stored on a portion of said storage medium separate from a portion upon which the geographical data set is stored.

22. The system of claim 14 wherein said data indicating whether said storage medium is entitled to be updated is stored on an EPROM.

23. The system of claim 14 wherein said data indicating whether said storage medium is entitled to be updated includes a serial number.

24. The system of claim 14 wherein said data indicating whether said storage medium is entitled to be updated includes a cartridge serial number.

25. The system of claim 14 wherein data indicating whether said storage medium is entitled to be updated includes subscription data.

26. The system of claim 14 wherein said data indicating whether said storage medium is entitled to be updated is encrypted.

27. The system of claim 14 wherein said geographical data set includes data for more than one geographical region.

28. The system of claim 14 wherein said geographical data set and said navigation application program are installed in a vehicle.

29. The system of claim 28 wherein said vehicle is a land-based vehicle.

30. The system of claim 14 wherein at least said geographical data set and said navigation application program are installed in a laptop personal computer.

31. The system of claim 14 wherein said navigation application program is stored on said storage medium.

32. The system of claim 14 wherein said storage medium comprises a hard drive and an EPROM, and wherein said geographical data set is stored on the hard drive and the data indicating whether said storage medium is entitled to be updated is stored on said EPROM.

33. The system of claim 14 wherein said storage medium is a CD-ROM.

34. A system for upgrading navigation systems comprising:

a navigation system as in claim 14;

and wherein said external source comprises a data repository comprising:

an updated version of navigation data for said navigation system; and a replication device for storing the updated navigation data on the navigation system.

35. The system for upgrading navigation systems of claim 34 wherein said data repository further comprises:

means for verifying that said navigation system is entitled to be upgraded.

36. The system for upgrading navigation systems of claim 35 wherein said verifying means comprises means for reading said data indicating whether said storage medium is entitled to be updated.

37. A system for upgrading in-vehicle navigation systems comprising:

a plurality of vehicles in a geographical area, wherein each of said vehicles includes a navigation system as in claim 14;

wherein said external source is comprised of any one of a plurality of local repositories located in said geographical area, each of said plurality of local repositories comprising:
   updated versions of navigation data; and
   a replication device for storing the updated navigation data on the navigation systems of said vehicles.

38. A method for providing updated versions of a navigation data product for subscribers of said updated versions of the navigation data product in a geographical area, comprising the steps of:
   preparing a master copy of an updated data product at a central location;
   installing the master copy onto media at local repositories in the geographical area; and
   making the local repositories accessible to the subscribers.

39. The method of claim 38 further comprising:
   after the preparing step, sending the master copy to a regional location from which the master copy is installed on the local repositories.

40. The method of claim 38 wherein the installing step is performed by a person visiting the local repositories.

41. The method of claim 38 wherein the installing step is performed from a remote location by accessing the local repositories electronically.

42. The method of claim 38 wherein the data product comprises geographical data sets.

43. The method of claim 38 wherein the data product comprises a navigation application program.

44. The method of claim 38 wherein the master copy of the updated data product comprises navigation data that corresponds to the geographical area.

45. The method of claim 38 wherein there are a plurality of different geographical areas and a plurality of master copies of updated data products that correspond to said different geographical areas.

46. A method of updating vehicular navigation data stored on storage media in vehicles, wherein said vehicles include a plurality of different types of navigation systems, comprising the steps of:
   providing a plurality of computers located in a geographical area, each of said plurality of computers having a device that can read and write to one of said storage media;
   removing one of said storage media from a vehicle;
   placing said one storage medium into said device;
   reading information stored on said one storage medium to determine which of said different types of navigation systems is used by the vehicle from which said storage medium was removed; and
   updating the navigation data on said storage medium.

47. The method of claim 46 wherein the step of reading further comprises:
   reading information on said storage medium to determine a release version of information stored on said storage medium.

48. The method of claim 46 further comprising:
   testing the storage medium; and
   replacing said storage medium if it is determined to be defective.

49. The method of claim 46 wherein said storage medium includes both a navigation system application program and the geographical data set.

50. The method of claim 46 further comprising:
   updating the navigation system application program on said storage medium.

51. The method of claim 46 wherein current geographical data sets are stored on said plurality of computers in said geographical area.

52. The method of claim 51 wherein the current data set files are updated periodically.

53. The method of claim 52 wherein the current data set files are updated by an electronic communication connection to a remote location.

54. The method of claim 46 further comprising:
   physically traveling to each of said plurality of computers in said geographical area; and
   updating each of said plurality of computers in said geographical area with information physically carried to each of said plurality of computers.

55. A system for updating a plurality of data products stored on a population of media, comprising:
   a local repository having:
      means for receiving one of said population of media into said local repository;
      means for verifying that said one of said population of media is entitled to be updated; and
      means for storing an updated version of said data stored onto said one of said population of media.

56. The system of claim 55 further comprising:
   means for recording that an updated version of at least one of said plurality of data products stored on said one of said plurality of media has been updated to a level corresponding to at least one of said updated versions stored on said local repositories.

57. The system of claim 55 further comprising:
   means for identifying which of said plurality of data products are stored on one of said population of media.

58. The system of claim 55 wherein said population of media are portable storage devices for in-vehicle navigation systems.

59. A system for updating a plurality of data products stored on a population of portable media, comprising:
   a plurality of local repositories located at specific locations within a geographical area, wherein at least some of said local repositories include a means for updating said plurality of software products; wherein said means for updating includes:
      means for identifying which of said plurality of data products are stored on a single one of said plurality of portable media;
      means for updating data products stored on said single one of said portable media; and
      means for recording that data stored on said single one of said plurality of portable media has been updated to a level corresponding to an updated version stored on said local repositories.

60. The system of claim 59 further comprising:
   means for verifying that a data product stored on said single one of said portable media is covered by a subscription.

61. The system of claim 59 further comprising:
   means for confirming that a valid subscription covers updating of said data products stored on said single one of said portable media.

62. The system of claim 59 wherein said population of portable media are included in land-based vehicles.

63. A method of updating types of navigation systems in vehicles, comprising:

providing updated versions of navigation data on a server;

providing on-line access to the server for owners of navigation systems installed in vehicles;

receiving information from the data storage media of owners of navigation systems installed in vehicles, wherein said storage media includes data identifying the types of navigation systems for which updated data is sought; and uploading updated versions of said navigation data from said server to said owners.

64. The method of claim 63 further comprising:

receiving information from said owners indicating entitlement to said updated versions of said navigation data.

65. The method of claim 63 wherein said data indicating the types of navigation systems are obtained from storage devices removed from owners' in-vehicle navigation systems.

66. The method of claim 63 wherein said storage devices are inserted in personal computers of said owners.

67. A system for upgrading navigation systems installed in vehicles wherein each of said navigation systems comprises a navigation application program and geographical data information stored on a storage medium of said navigation system, said upgrading system comprising:

a plurality of local repositories, wherein each one of said local repositories comprises:

updated versions of geographical data information stored on a storage medium of said one of local repositories;

a device for copying the updated geographical data information from said storage medium of said one of said local repositories to said storage medium of said navigation system; and a program that identifies the type of navigation system for which updated data is sought, whereby updated data appropriate for said type of navigation system can be selected for said copying the updated geographical data information from said storage medium of said one of said local repositories to said storage medium of said navigation system.

68. The system of claim 67 wherein each one of said local repositories further comprises:

a verification system to ascertain whether a storage medium of said in-vehicle navigation system is entitled to be upgraded.

69. An upgradable navigation system comprising:

navigation data on a portable storage medium; and
wherein said portable storage medium further includes an EPROM including information indicating whether said storage medium is entitled to be updated.

70. A system for updating navigation data stored on navigation systems installed in vehicles, wherein each of said navigation systems includes identification information indicating whether said navigation system is entitled to be updated, said updating system comprising:

a repository at which updated versions of said navigation data for said navigation systems are stored; and a plurality of local terminal stations accessible to owners of said vehicles and located in a geographical area, wherein each of said plurality of local terminal stations comprises:

a communication link to said repository;

means for confirming entitlement of each of said navigation systems to be updated, said confirming means responsive to said identification information on each of said navigation systems; and a device for updating one of said navigation systems with one of said updated versions of said navigation data received over said communication link to said repository, said updating device responsive to said confirming means.

71. The system of claim 70 wherein said navigation data comprises geographical data sets.

72. The system of claim 70 wherein said navigation data comprises information about streets that said vehicles may travel.

73. The system of claim 70 wherein said navigation data comprises updated versions of navigation application programs.

74. A system for updating data stored on a portable storage medium, wherein said portable storage medium comprises a hard drive and an EPROM, said data is stored on said hard drive, and said EPROM includes information stored thereon indicating entitlement to said updating of said data.

* * * * *